US009542096B2

(12) United States Patent
Hatanaka

(10) Patent No.: US 9,542,096 B2
(45) Date of Patent: *Jan. 10, 2017

(54) MOBILE CLIENT DEVICE, OPERATION METHOD, RECORDING MEDIUM, AND OPERATION SYSTEM

(71) Applicants: SONY CORPORATION, Tokyo (JP); Sony Mobile Communications, Inc., Tokyo (JP)

(72) Inventor: Yosuke Hatanaka, Tokyo (JP)

(73) Assignees: SONY CORPORATION, Tokyo (JP); SONY MOBILE COMMUNICATIONS, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/995,971

(22) Filed: Jan. 14, 2016

(65) Prior Publication Data

US 2016/0139800 A1  May 19, 2016

Related U.S. Application Data

(63) Continuation of application No. 13/937,797, filed on Jul. 9, 2013, now Pat. No. 9,268,424.

(Continued)

(51) Int. Cl.
*G06F 3/041* (2006.01)
*G06F 3/0488* (2013.01)
(Continued)

(52) U.S. Cl.
CPC .......... *G06F 3/04883* (2013.01); *G06F 3/041* (2013.01); *G06F 3/0412* (2013.01); *G06F 3/0416* (2013.01); *G06F 3/0482* (2013.01); *G06F 3/0485* (2013.01); *G06F 3/04817* (2013.01); *G08C 17/02* (2013.01); *H04N 5/4403* (2013.01); *H04N 21/4222* (2013.01); *H04N 21/42207* (2013.01); *H04N 21/42209* (2013.01); *H04N 21/42222* (2013.01); *H04N 21/42224* (2013.01); *H04N 21/472* (2013.01); *H04N 21/482* (2013.01); *G08C 2201/30* (2013.01); *G08C 2201/93* (2013.01); *H04N 2005/443* (2013.01)

(58) Field of Classification Search
CPC ...... G06F 3/041; G06F 3/04883; G08C 17/02; G08C 2201/30; G08C 2201/93; H04N 21/472; H04N 21/482; H04N 21/4222; H04N 21/42207; H04N 21/42222; H04N 21/42224
USPC .......... 345/7, 8, 156–184; 710/316; 715/733
See application file for complete search history.

(56) References Cited

U.S. PATENT DOCUMENTS 4,521,870 A     6/1985  Babbel et al.
8,576,185 B2 *  11/2013 Yamashita ............ G06F 1/1654
                                                345/1.1

(Continued)

*Primary Examiner* — Prabodh M Dharia
(74) *Attorney, Agent, or Firm* — Oblon, McClelland, Maier & Neustadt, L.L.P.

(57) ABSTRACT

An information processing apparatus that detects an input operation to a touch panel based on an output of the touch panel; creates an operation command to change content displayed on a display apparatus based on a detected input operation to the touch panel; and controls a wireless interface to transmit the operation command to the display apparatus controlling the display apparatus to change the content displayed on the display apparatus.

19 Claims, 28 Drawing Sheets

Related U.S. Application Data

(60) Provisional application No. 61/672,812, filed on Jul. 18, 2012.

(51) Int. Cl.
  *G08C 17/02* (2006.01)
  *H04N 21/422* (2011.01)
  *H04N 21/472* (2011.01)
  *H04N 21/482* (2011.01)
  *G06F 3/0481* (2013.01)
  *G06F 3/0482* (2013.01)
  *G06F 3/0485* (2013.01)
  *H04N 5/44* (2011.01)

(56) References Cited

U.S. PATENT DOCUMENTS

| | | |
|---|---|---|
| 2003/0201982 A1 | 10/2003 | Iesaka |
| 2007/0146347 A1* | 6/2007 | Rosenberg .......... G06F 3/04883 345/173 |
| 2008/0036743 A1 | 2/2008 | Westerman et al. |
| 2008/0165141 A1 | 7/2008 | Christie |
| 2008/0249654 A1 | 10/2008 | Pedraza et al. |
| 2008/0309632 A1 | 12/2008 | Westerman et al. |
| 2009/0178008 A1 | 7/2009 | Herz et al. |
| 2009/0228842 A1* | 9/2009 | Westerman .......... G06F 3/04883 715/863 |
| 2010/0013780 A1 | 1/2010 | Ikeda et al. |
| 2010/0060568 A1 | 3/2010 | Fisher et al. |
| 2010/0127847 A1 | 5/2010 | Evans et al. |
| 2010/0295789 A1 | 11/2010 | Shin et al. |
| 2011/0007021 A1 | 1/2011 | Bernstein et al. |
| 2011/0025649 A1 | 2/2011 | Sheikhzadeh Nadjar et al. |
| 2011/0074717 A1* | 3/2011 | Yamashita ............ G06F 1/1654 345/173 |
| 2011/0078560 A1 | 3/2011 | Weeldreyer et al. |
| 2011/0084925 A1* | 4/2011 | Baik .................. G06F 3/04817 345/173 |
| 2011/0115734 A1 | 5/2011 | Harashima et al. |
| 2011/0164063 A1 | 7/2011 | Shimotani et al. |
| 2011/0239155 A1 | 9/2011 | Christie |
| 2011/0296351 A1* | 12/2011 | Ewing, Jr. ............ G06F 3/0346 715/841 |
| 2011/0302495 A1 | 12/2011 | Pinto et al. |
| 2011/0305369 A1 | 12/2011 | Bentley et al. |
| 2012/0019453 A1* | 1/2012 | Westerman ......... G06F 3/04883 345/173 |
| 2012/0030636 A1* | 2/2012 | Miyazaki ............ G06F 3/04812 715/863 |
| 2012/0042272 A1 | 2/2012 | Hong et al. |
| 2012/0060668 A1 | 3/2012 | Lengeling et al. |
| 2012/0066621 A1* | 3/2012 | Matsubara ............ G06F 3/0485 715/764 |
| 2012/0066627 A1* | 3/2012 | Furukawa ............. G06F 3/0488 715/768 |
| 2012/0066644 A1* | 3/2012 | Mizutani ................ G06F 3/0482 715/810 |
| 2012/0068857 A1 | 3/2012 | Rothkopf et al. |
| 2012/0071208 A1 | 3/2012 | Lee et al. |
| 2012/0075181 A1 | 3/2012 | Algreatly |
| 2012/0081294 A1 | 4/2012 | Dinh et al. |
| 2012/0162066 A1 | 6/2012 | Herz et al. |
| 2012/0176333 A1 | 7/2012 | Kim et al. |
| 2012/0249466 A1 | 10/2012 | Ito et al. |
| 2012/0254793 A1* | 10/2012 | Briand .................... G06F 3/048 715/800 |
| 2012/0274594 A1 | 11/2012 | Prest et al. |
| 2012/0299870 A1 | 11/2012 | Chi et al. |
| 2013/0002580 A1* | 1/2013 | Sudou .................... G06F 3/038 345/173 |
| 2013/0076651 A1 | 3/2013 | Reimann et al. |
| 2013/0112067 A1 | 5/2013 | Lengeling et al. |
| 2013/0222305 A1* | 8/2013 | Kanno .................. G06F 3/0484 345/173 |
| 2013/0321335 A1 | 12/2013 | Tokutake |
| 2014/0040769 A1* | 2/2014 | Lazaridis ............. G06F 3/0483 715/752 |
| 2014/0233059 A1* | 8/2014 | Itoh .................... H04N 1/00411 358/1.15 |
| 2015/0121225 A1 | 4/2015 | Somasundaram |

\* cited by examiner

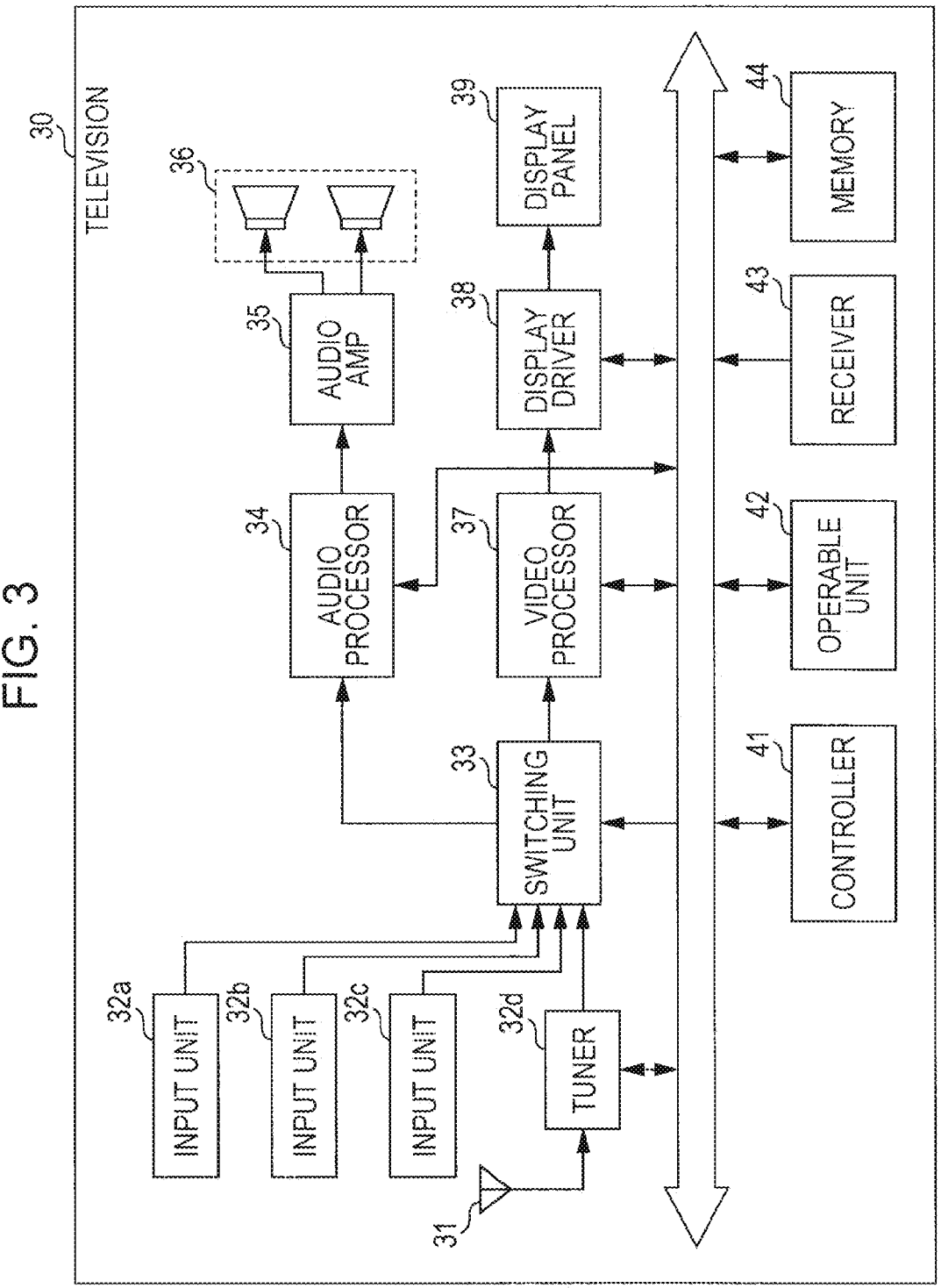

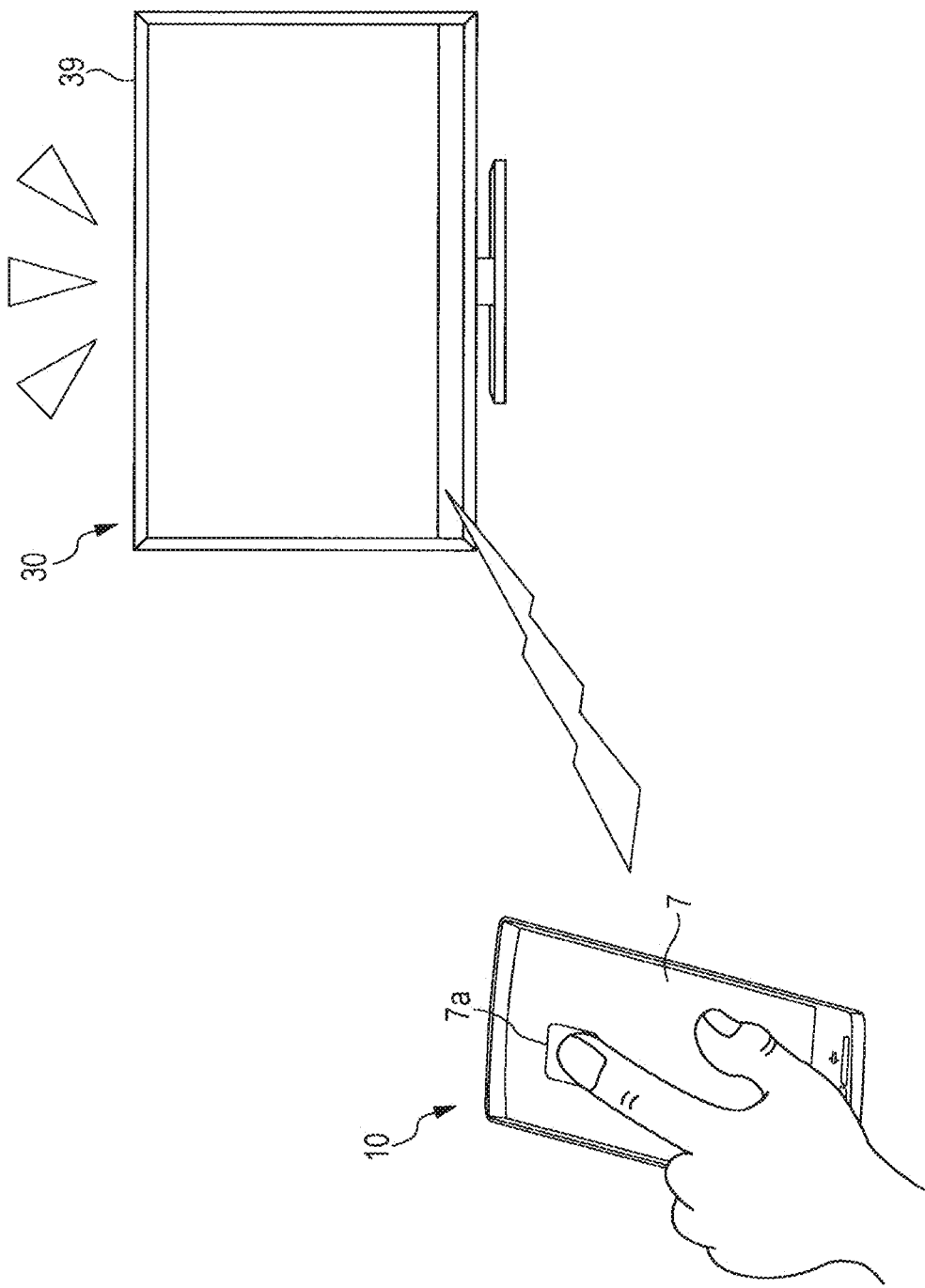

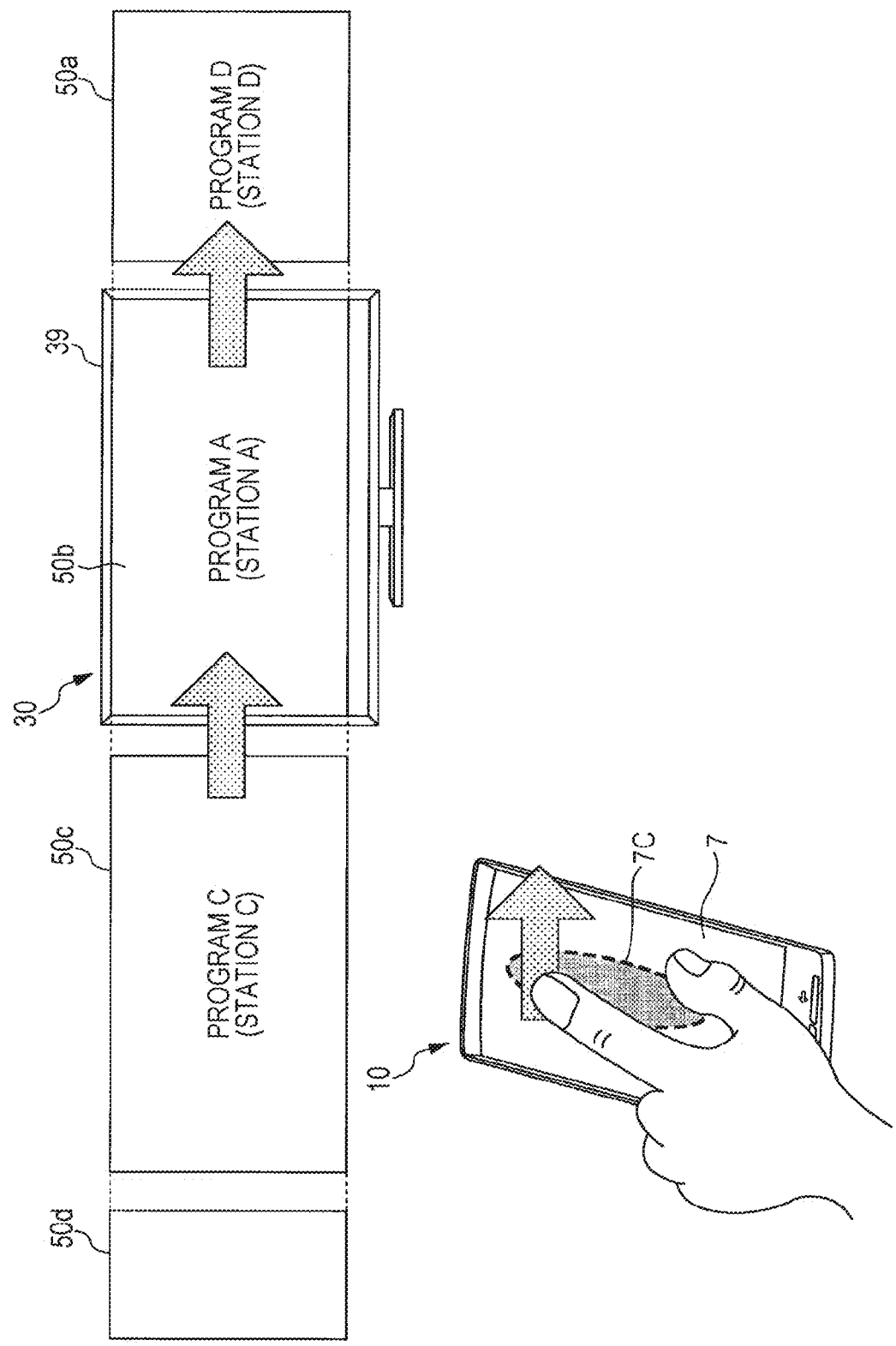

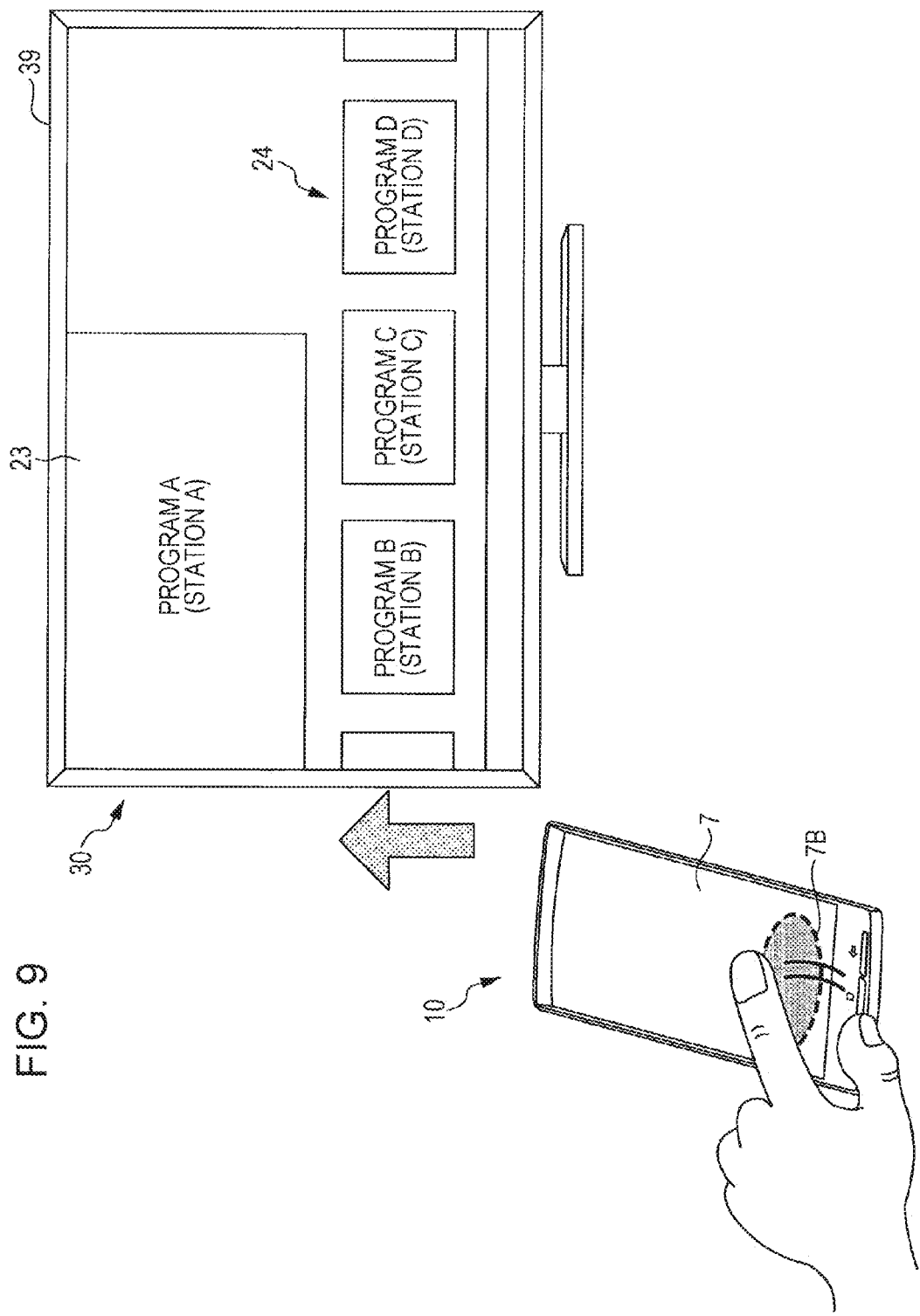

FIG. 10
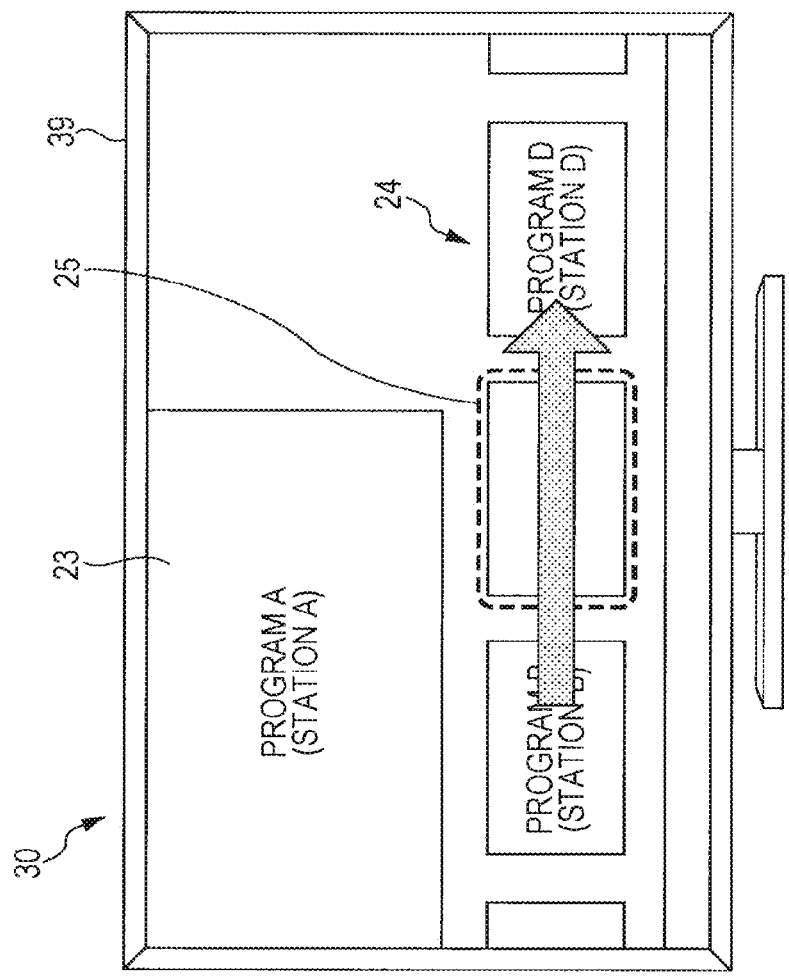
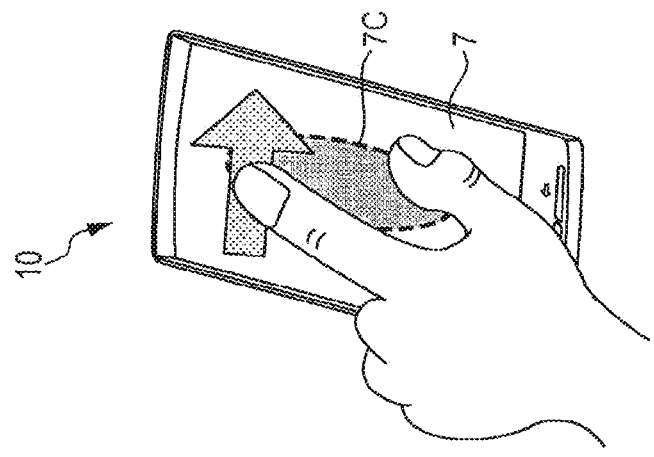

FIG. 11
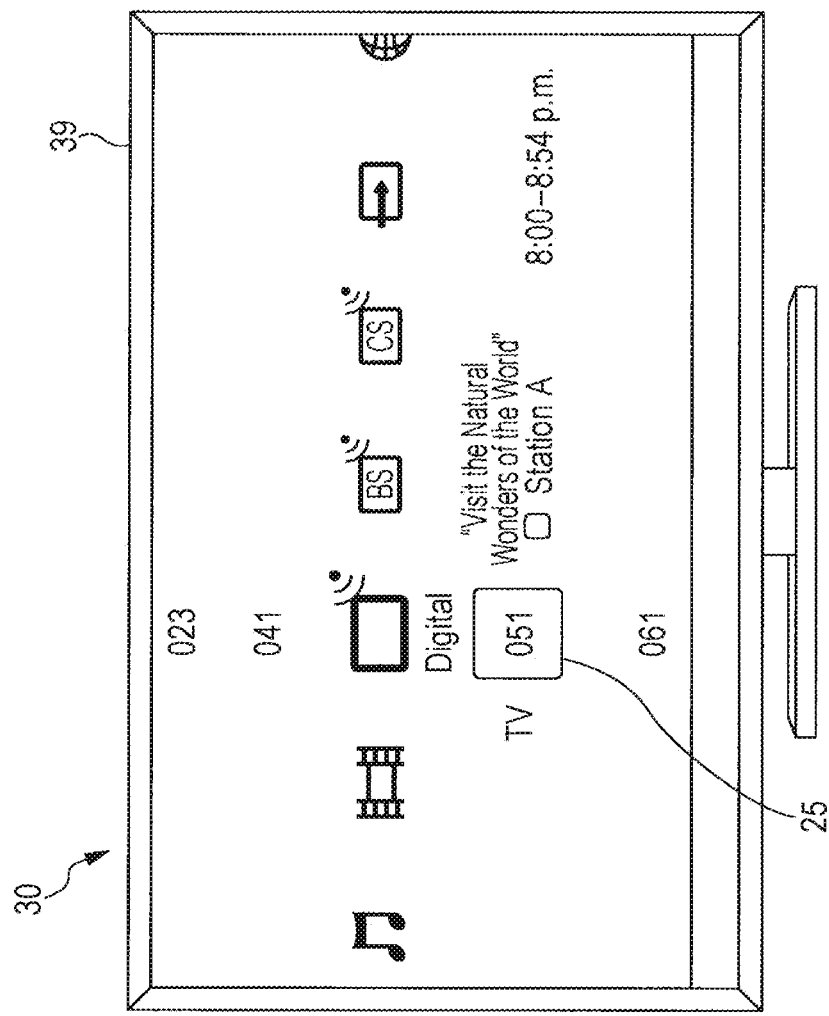
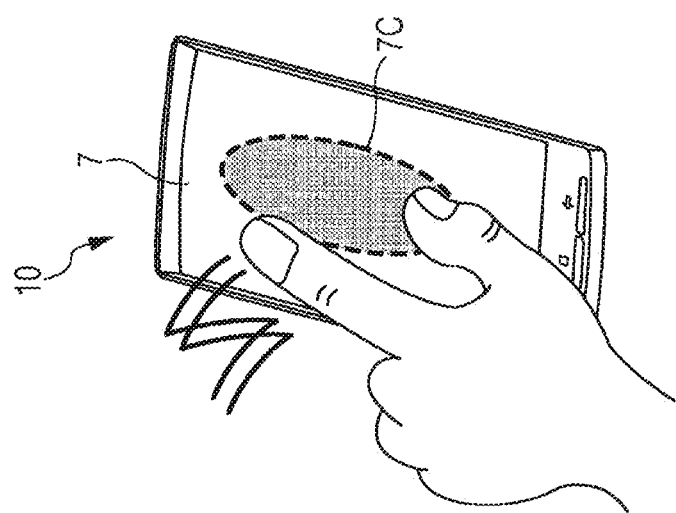

FIG. 12
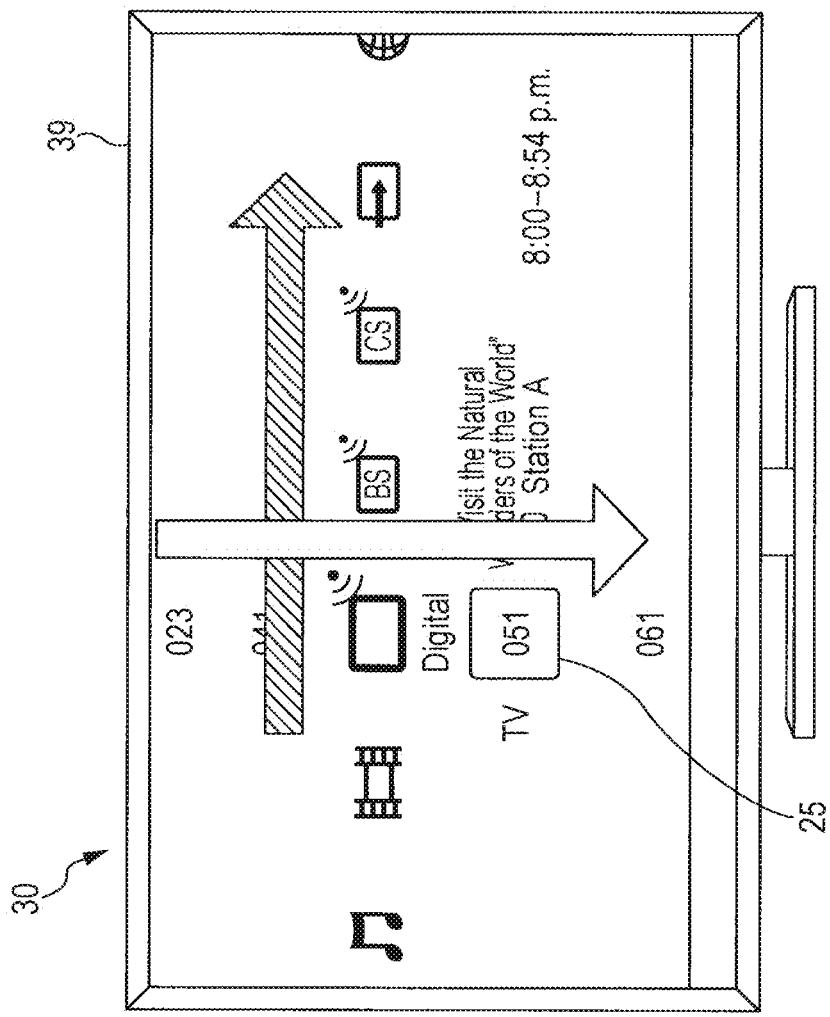
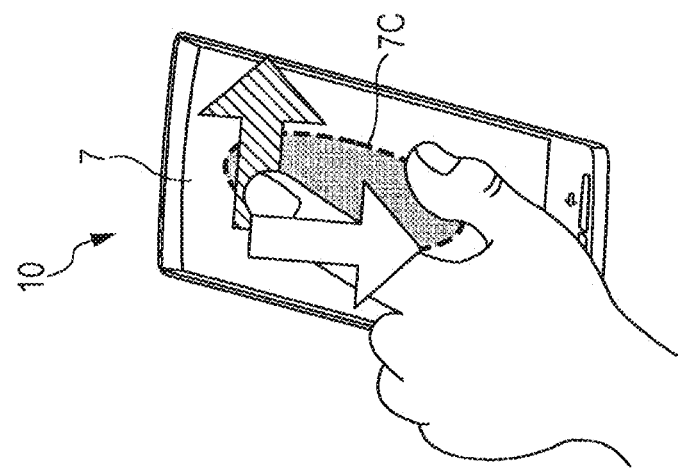

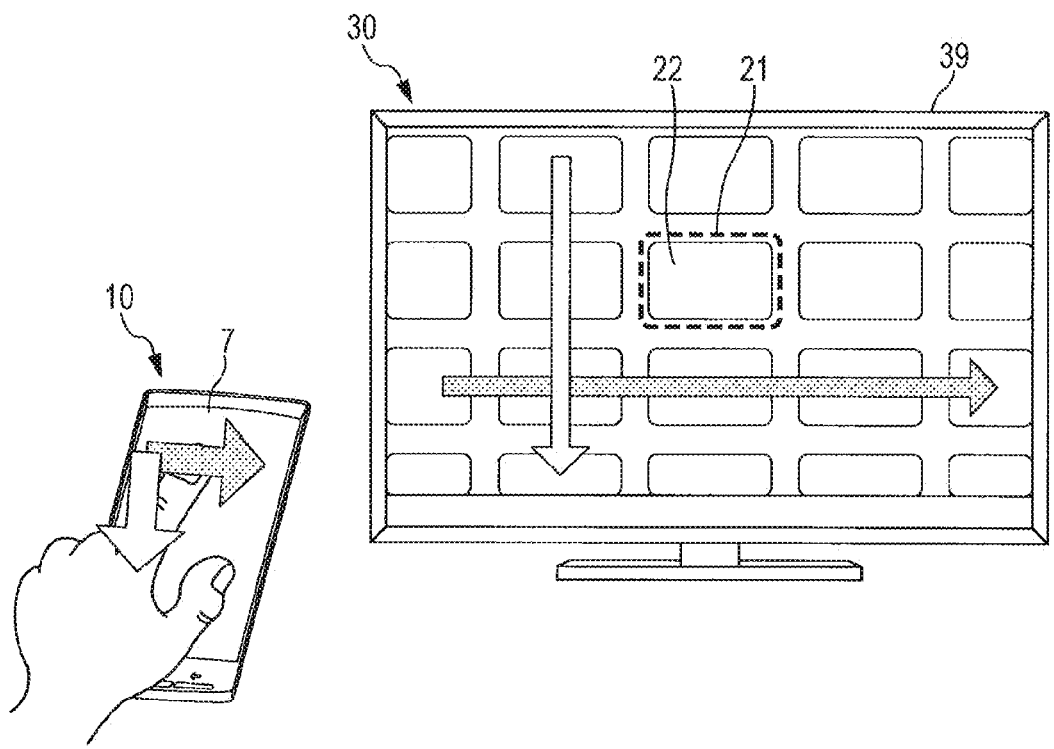

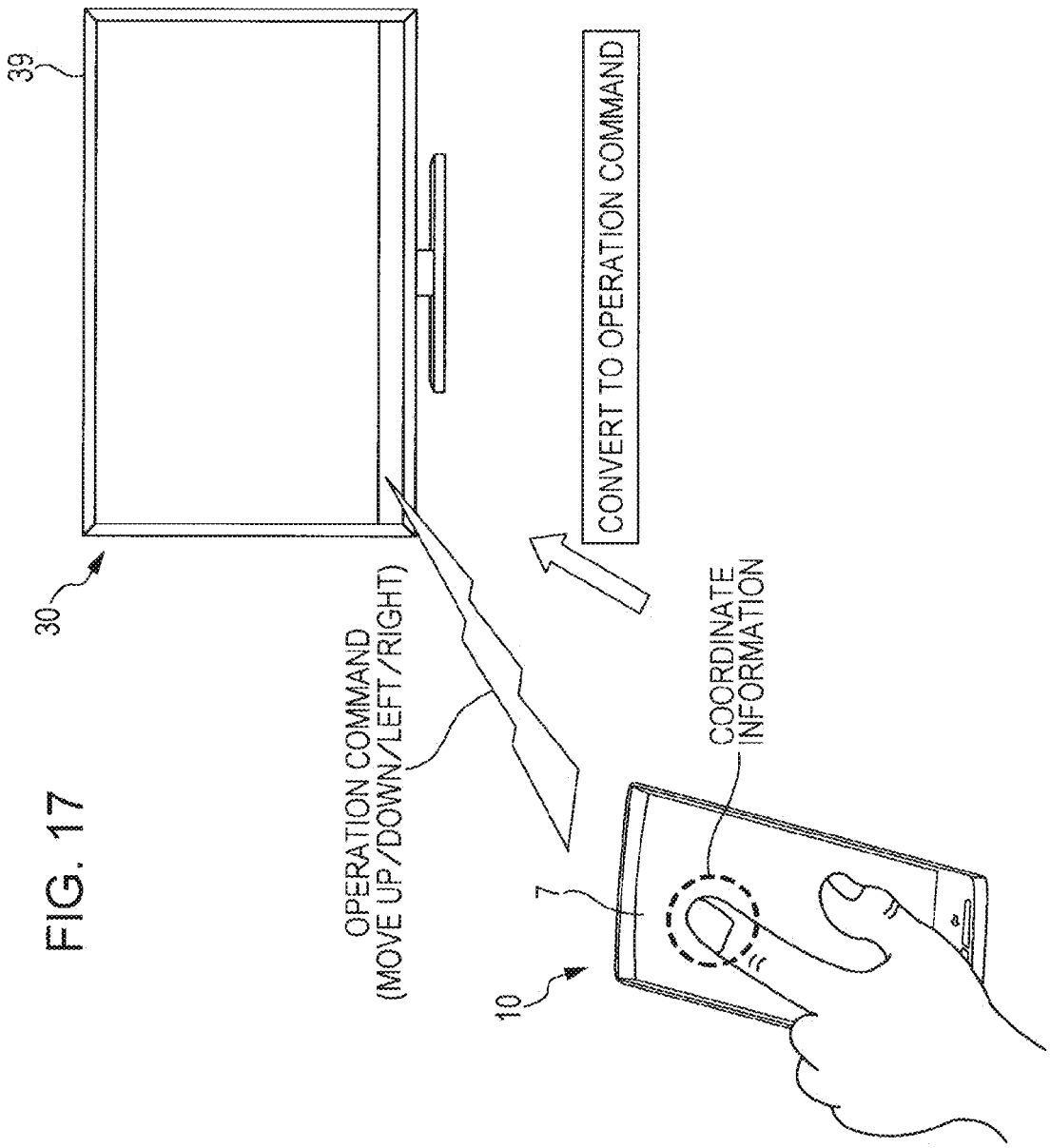

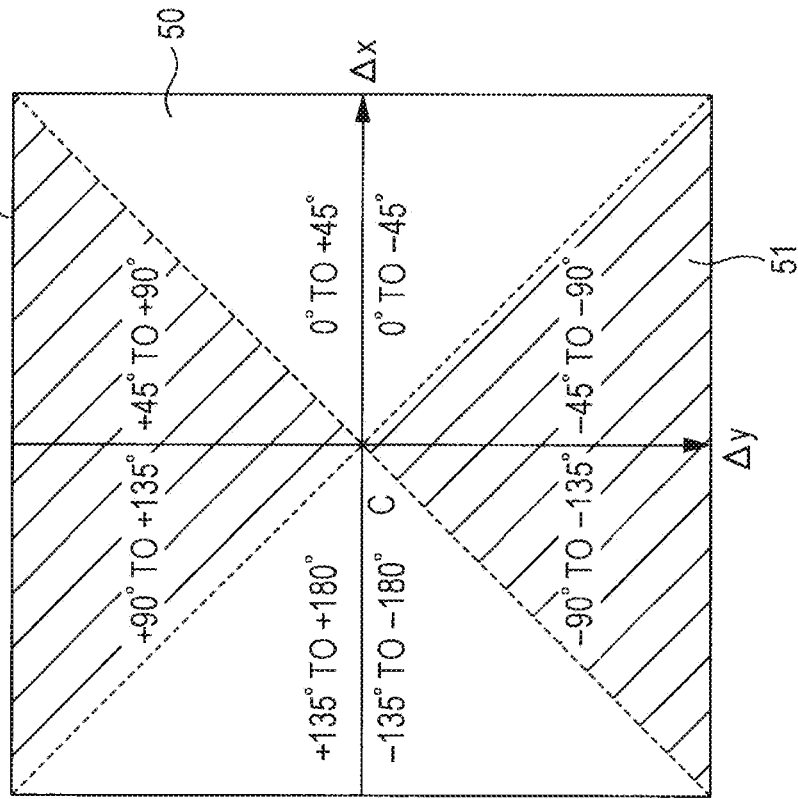
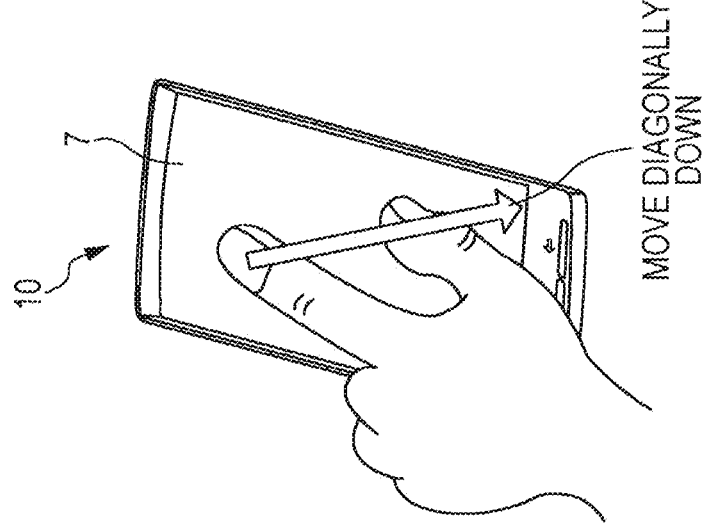

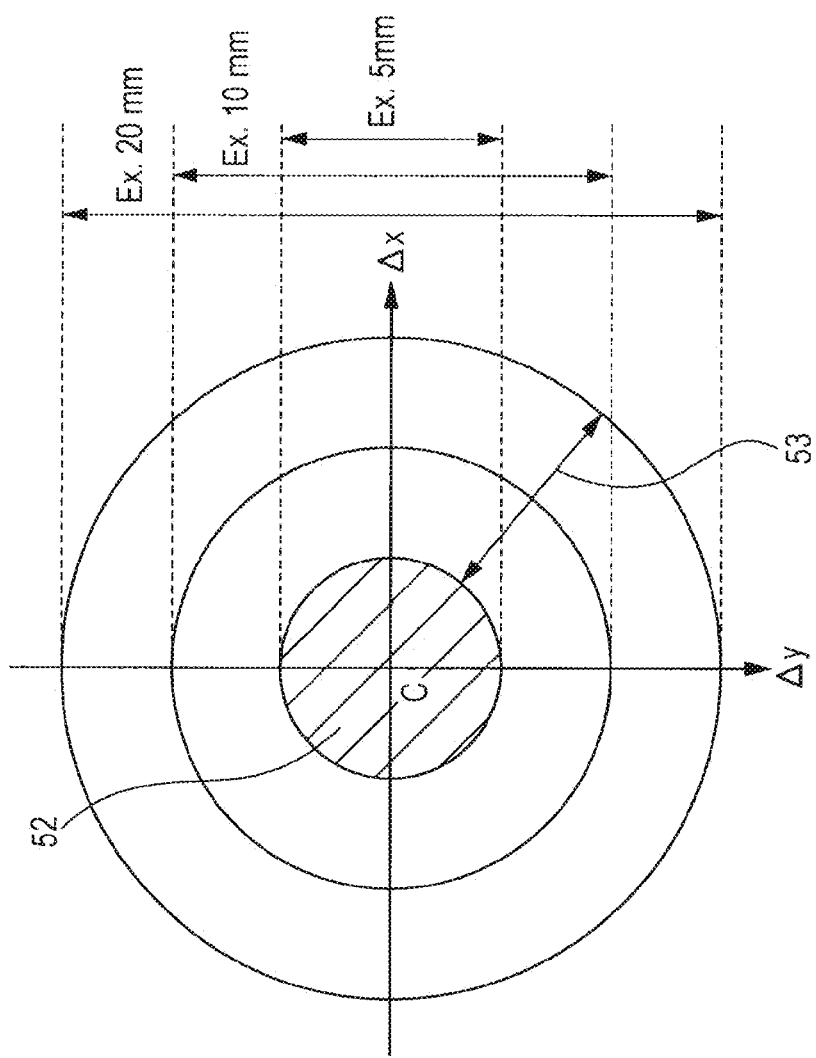
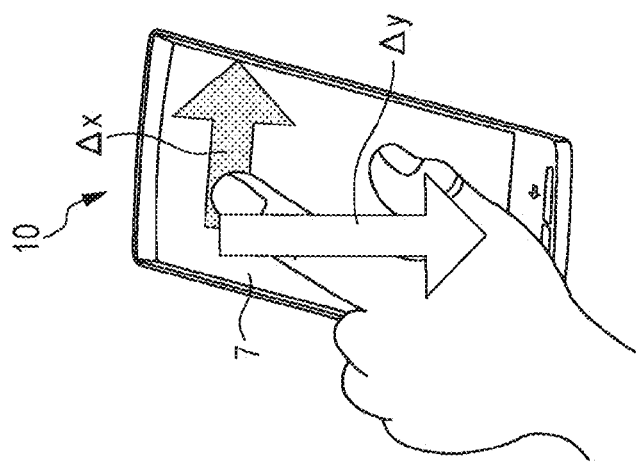

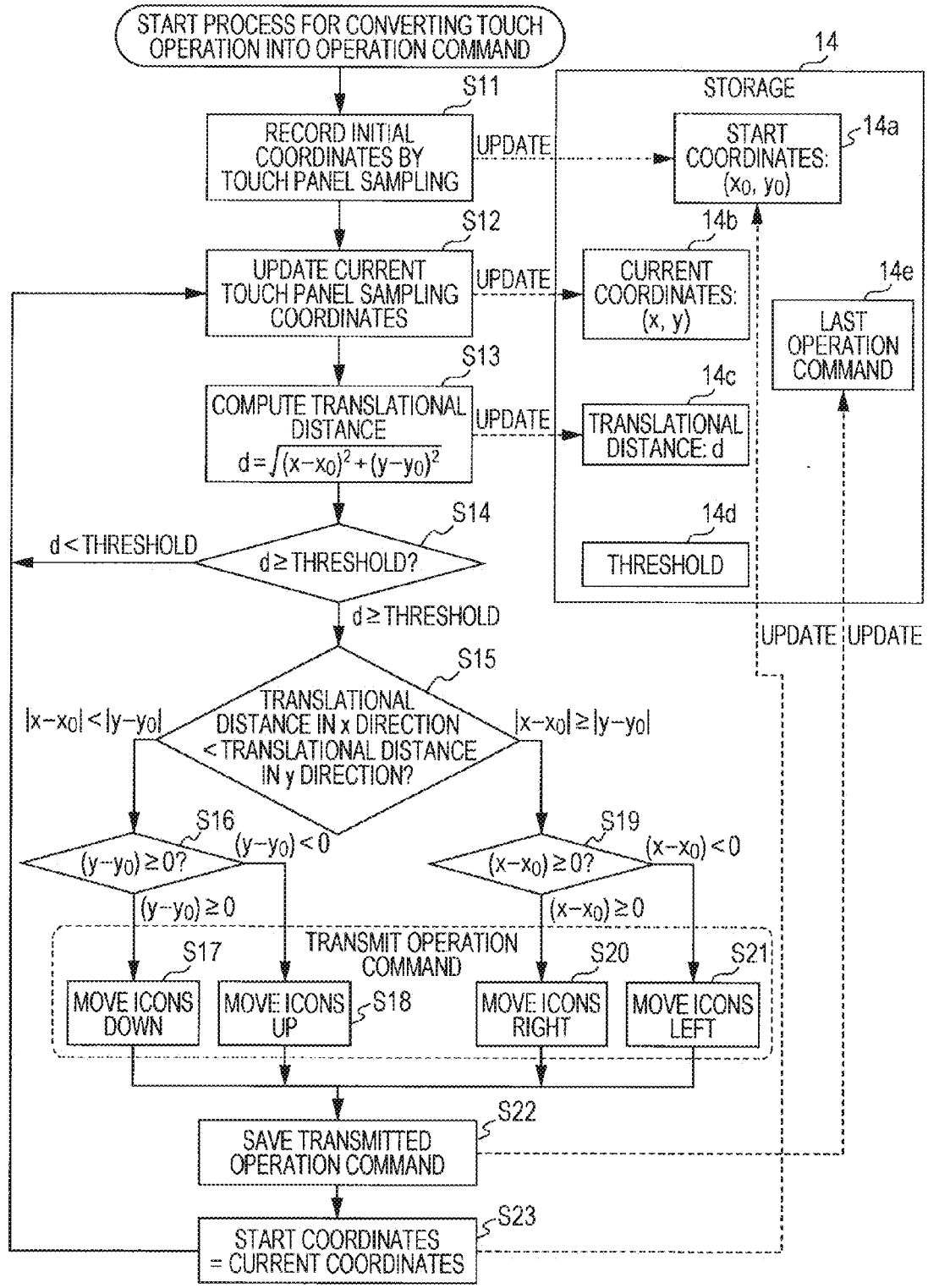

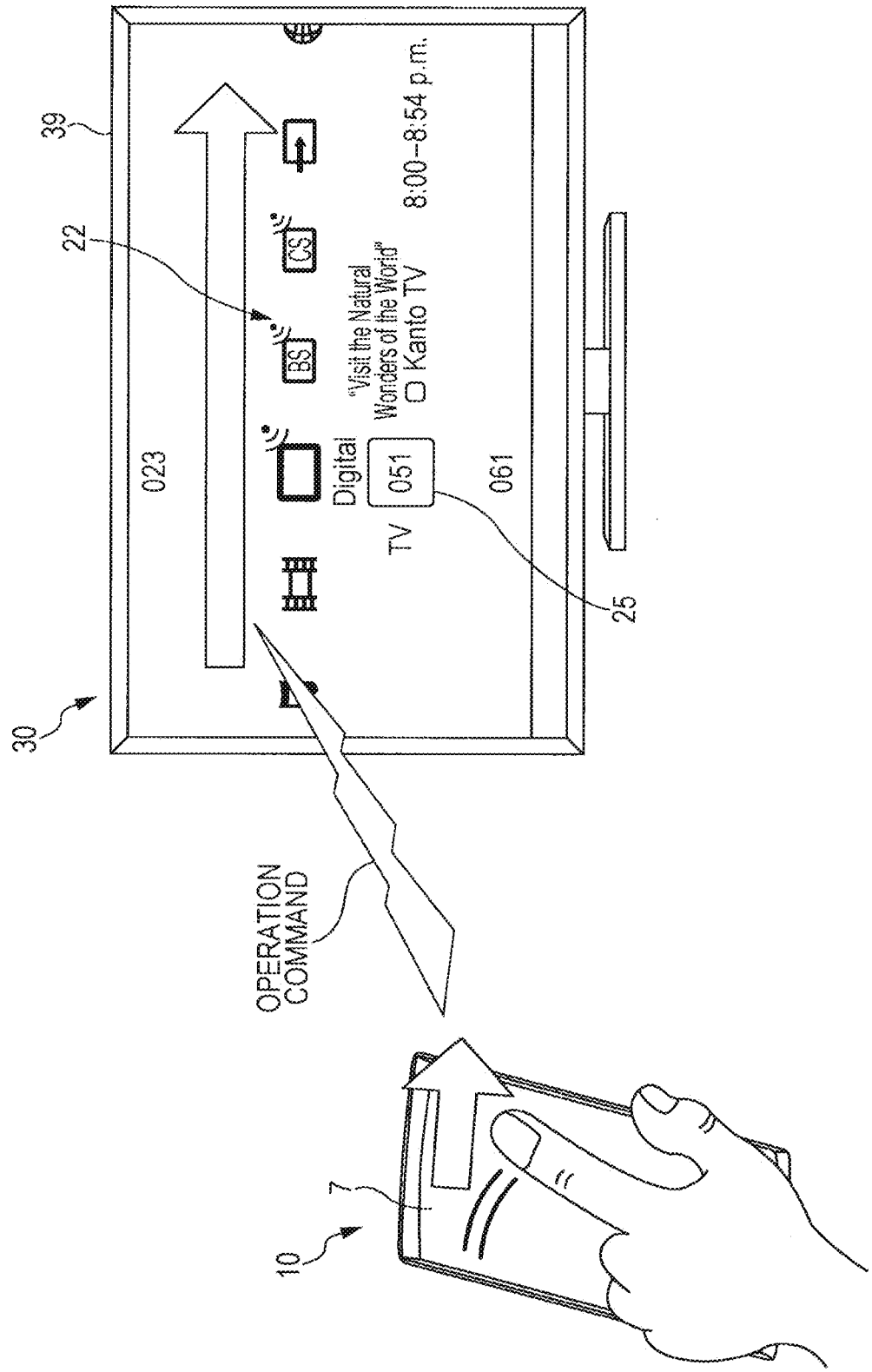

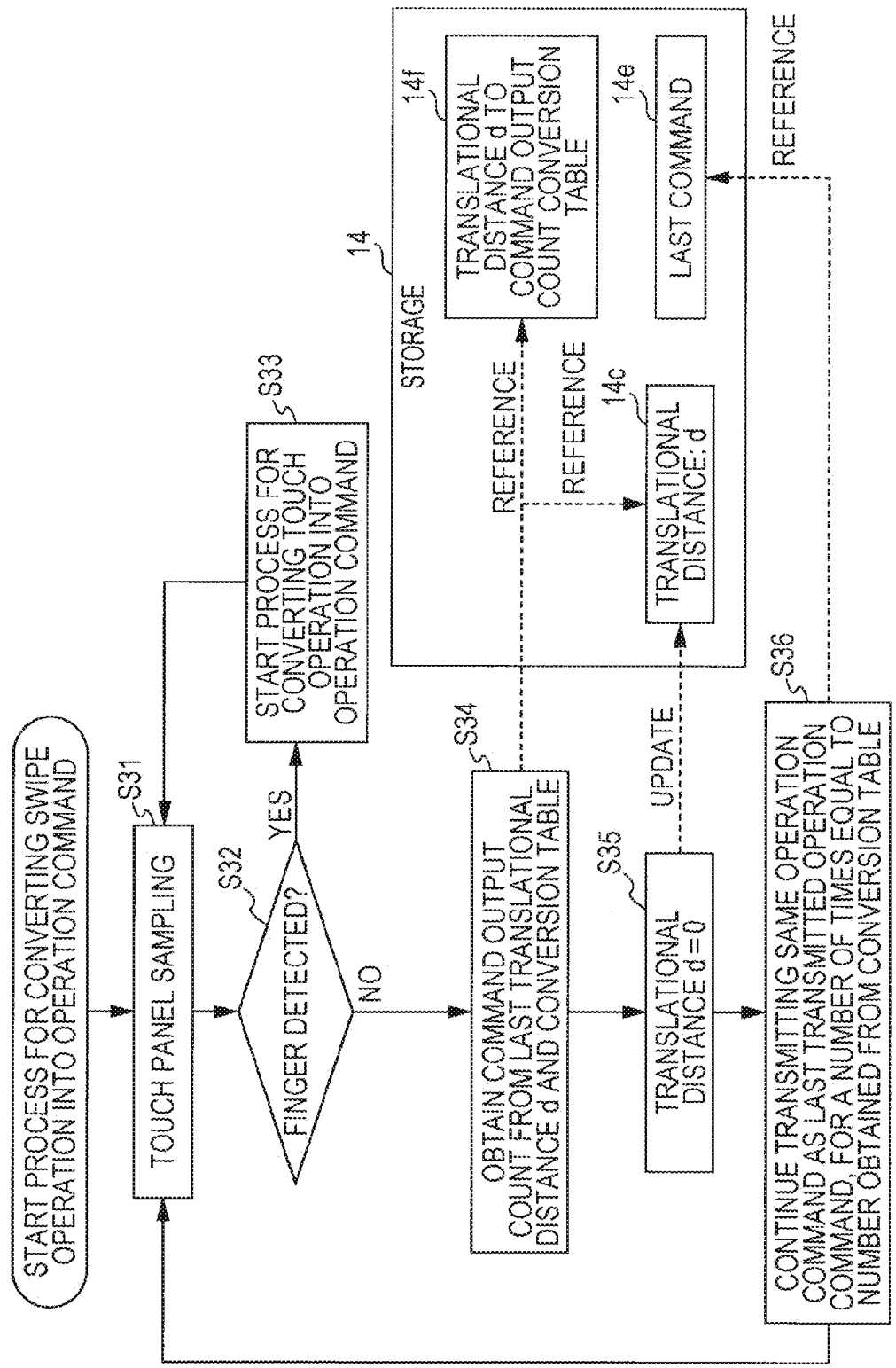

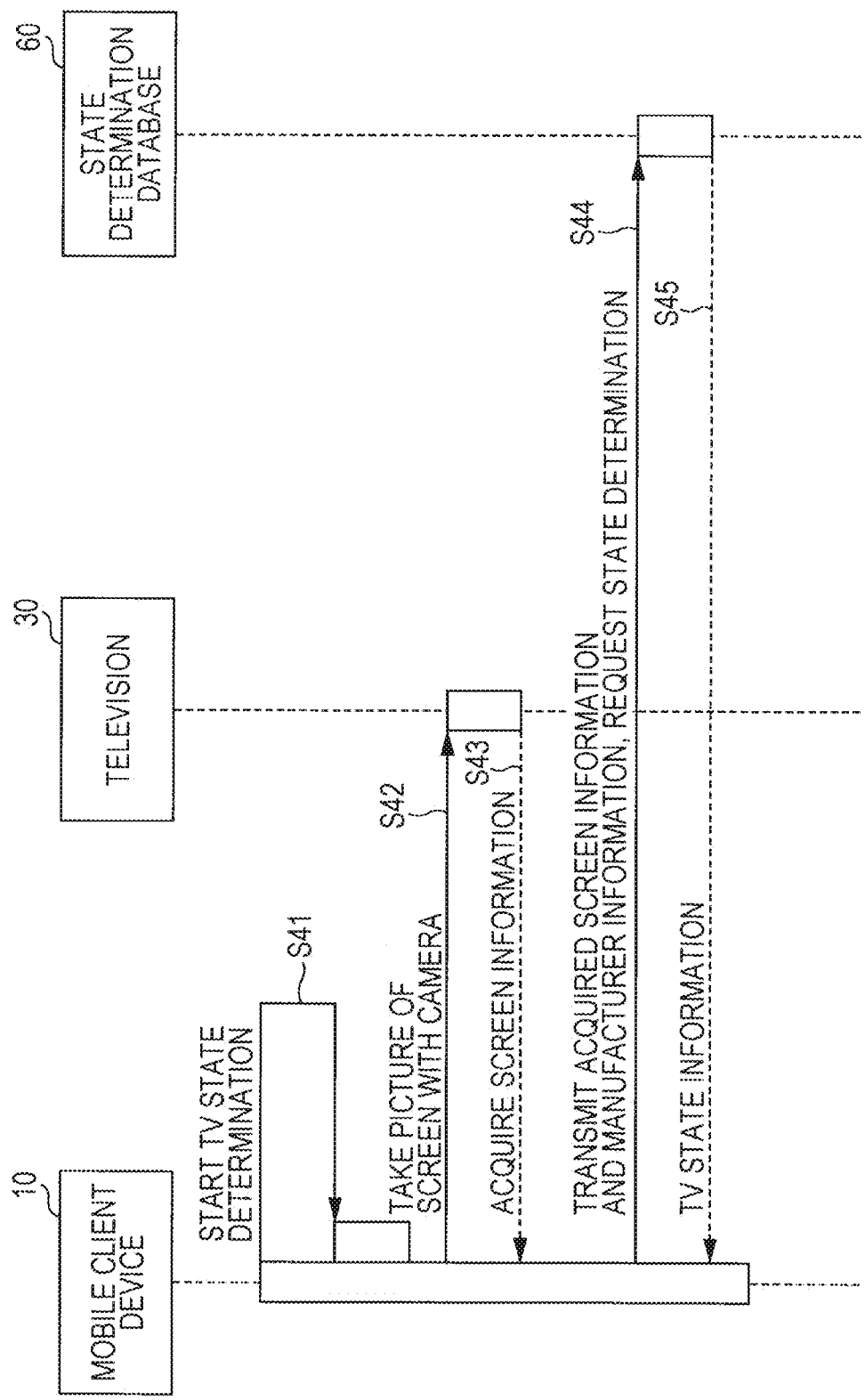

FIG. 27

| OPERATION LOCATION | OPERATION TYPE | POWER OFF STATE | POWER ON STATE | MENU SCREEN DISPLAY STATE | OPTIONS SCREEN DISPLAY STATE |
|---|---|---|---|---|---|
| ARBITRARY | LAUNCH APP | POWER ON | — | — | — |
| NEAR CENTER OF PANEL | TAP | — | — | OK | OK |
| | DOUBLE TAP | — | MENU SCREEN ON | MENU SCREEN OFF | |
| | LONG PRESS | POWER ON | POWER OFF | POWER OFF | POWER OFF |
| | FINGER MOVEMENT | — | — | UP/DOWN/ LEFT/RIGHT: MOVE ICONS | UP/DOWN: MOVE ICONS |
| | SWIPE | — | RIGHT: CHANNEL + LEFT: CHANNEL − | UP/DOWN/ LEFT/RIGHT: MOVE ICONS (WITH INERTIA) | RIGHT: CHANNEL + LEFT: CHANNEL − UP/DOWN: MOVE ICONS (WITH INERTIA) |
| RIGHT EDGE OF PANEL | TAP | — | BRING IN OPTIONS SCREEN FROM RIGHT SIDE OF SCREEN | — | RETURN TO POWER ON STATE |

| OPERATION LOCATION | OPERATION TYPE | POWER OFF STATE | POWER ON STATE | PROGRAM LIST DISPLAY STATE | OPTIONS SCREEN DISPLAY STATE |
|---|---|---|---|---|---|
| LEFT EDGE OF PANEL | TAP | — | LAUNCH WIDGET | — | — |
| TOP EDGE OF PANEL | TAP | — | SWITCH INPUT | OK | — |
| BOTTOM EDGE OF PANEL | TAP | — | TO PROGRAM LIST DISPLAY STATE | END PROGRAM LIST DISPLAY STATE, RETURN TO POWER ON STATE | — |

FIG. 29

| SENSORS/<br>BUTTONS USED | OPERATION TYPE | OPERATION<br>COMMAND |
|---|---|---|
| ACCELERATION<br>SENSOR | WAVE CLIENT DEVICE<br>TO THE RIGHT | CHANNEL + |
| | WAVE CLIENT DEVICE<br>TO THE LEFT | CHANNEL − |
| VOLUME<br>BUTTONS | VOLUME + BUTTON | TV VOLUME + |
| | VOLUME − BUTTON | TV VOLUME − |

MOBILE CLIENT DEVICE, OPERATION METHOD, RECORDING MEDIUM, AND OPERATION SYSTEM

CROSS REFERENCE TO RELATED APPLICATION

This application is a continuation of U.S. application Ser. No. 13/937,797, filed Jul. 9, 2013, which claims the benefit of priority from Provisional Application Ser. No. 61/672,812, filed Jul. 18, 2012. The entire contents of both of the above-noted applications are incorporated herein by reference.

BACKGROUND

1. Field of the Disclosure

The present disclosure relates to a mobile client device, operation method, recording medium, and operation system applied in the case where a user performs input operations on a touch panel to modify content displayed on a display device.

2. Description of Related Art

Recently, the functions in televisions are becoming more advanced and diverse. For example, by connecting a television to a household LAN, a user is able to display a web browser on the television and view web pages, and utilize social networking services. It is also possible to schedule the recording of programs, view videos delivered over the network, use video-on-demand functions, and switch to external inputs.

United States Patent Application Publication No. 2007/061757 describes a display control apparatus in which icons representing categories are arranged, and which makes items belonging to a category selectable after that category is selected by an operation from a remote control.

SUMMARY

In this way, in order to select from among many functions, a large number of buttons, etc. are provided on a television remote control. Also, performing operations can be inconvenient to the user if multiple functions are assigned to a single button.

For this reason, remote controls with simplified layouts have been provided, which may display an operable screen on a touch panel with the aim of simplifying operation. However, conventional remote controls in which input operations are performed using a touch panel merely substitute the operable buttons, etc. of a conventional remote control with icons representing those buttons displayed on a touch panel screen. For this reason, in some cases the user may press a button by mistake and be unable to perform an intended operation. In this way, a device with improved operability that capitalizes on the properties of touch panels has not been provided by conventional remote controls. Thus, the inventor has recognized the need to enable a user to easily and intuitively perform input operations using a touch panel.

According to one exemplary embodiment, the disclosure is directed to an information processing apparatus that detects an input operation to a touch panel based on an output of the touch panel; creates an operation command to change content displayed on a display apparatus based on a detected input operation to the touch panel; and controls a wireless interface to transmit the operation command to the display apparatus controlling the display apparatus to change the content displayed on the display apparatus.

BRIEF DESCRIPTION OF DRAWINGS

FIG. 3 is a block diagram illustrating an exemplary internal configuration of a television according to an embodiment of the present disclosure.

FIG. 7 is an explanatory diagram illustrating an exemplary operation in which a mobile client device according to an embodiment of the present disclosure is used to activate a television.

FIG. 8 is an explanatory diagram illustrating an exemplary operation for changing programs (stations) displayed on a display panel according to an embodiment of the present disclosure.

FIG. 9 is an explanatory diagram illustrating an exemplary operation for displaying a program list on a display panel according to an embodiment of the present disclosure.

FIG. 10 is an explanatory diagram illustrating an exemplary operation for changing programs according to an embodiment of the present disclosure.

FIG. 11 is an explanatory diagram illustrating an exemplary operation performed when activating a menu screen according to an embodiment of the present disclosure.

FIG. 12 is an explanatory diagram illustrating exemplary operations performed when operating a menu screen according to an embodiment of the present disclosure.

FIGS. 16A and 16B are explanatory diagrams illustrating touch operations performed on a touch panel and exemplary operations on selectable icons displayed on a television according to an embodiment of the present disclosure.

FIG. 17 is an explanatory diagram illustrating a precondition for a process in which an operation performed on a touch panel is converted into an operation command for a television and transmitted to the television according to an embodiment of the present disclosure.

FIGS. 18A and 18B are explanatory diagrams illustrating an example of converting finger movement directions into operation commands according to an embodiment of the present disclosure.

FIGS. 19A and 19B are explanatory diagrams illustrating an example of adjusting the numerical value of an operation command according to a finger translational magnitude according to an embodiment of the present disclosure.

FIG. 20 is a flowchart illustrating an exemplary process of converting a touch operation into an operation command according to an embodiment of the present disclosure.

FIG. 21 is an explanatory diagram illustrating an exemplary operation for moving selectable icons by performing a swipe gesture on a touch panel according to an embodiment of the present disclosure.

FIG. 22 is a flowchart illustrating an exemplary process of converting a swipe gesture into an operation command according to an embodiment of the present disclosure.

FIG. 26 is a sequence diagram illustrating an exemplary process according to an embodiment of the present disclosure, in which a mobile client device determines the state of a television.

FIG. 27 is a table illustrating associations between the operation locations and operation types for a power-off state, power-on state, menu screen display state, and options screen display state of a television according to an embodiment of the present disclosure.

FIG. 29 is a table illustrating associations between the operation types and operation commands of operations performed using an acceleration sensor and volume buttons used by a mobile client device according to a modification of an embodiment of the present disclosure.

DETAILED DESCRIPTION

Figure 1:
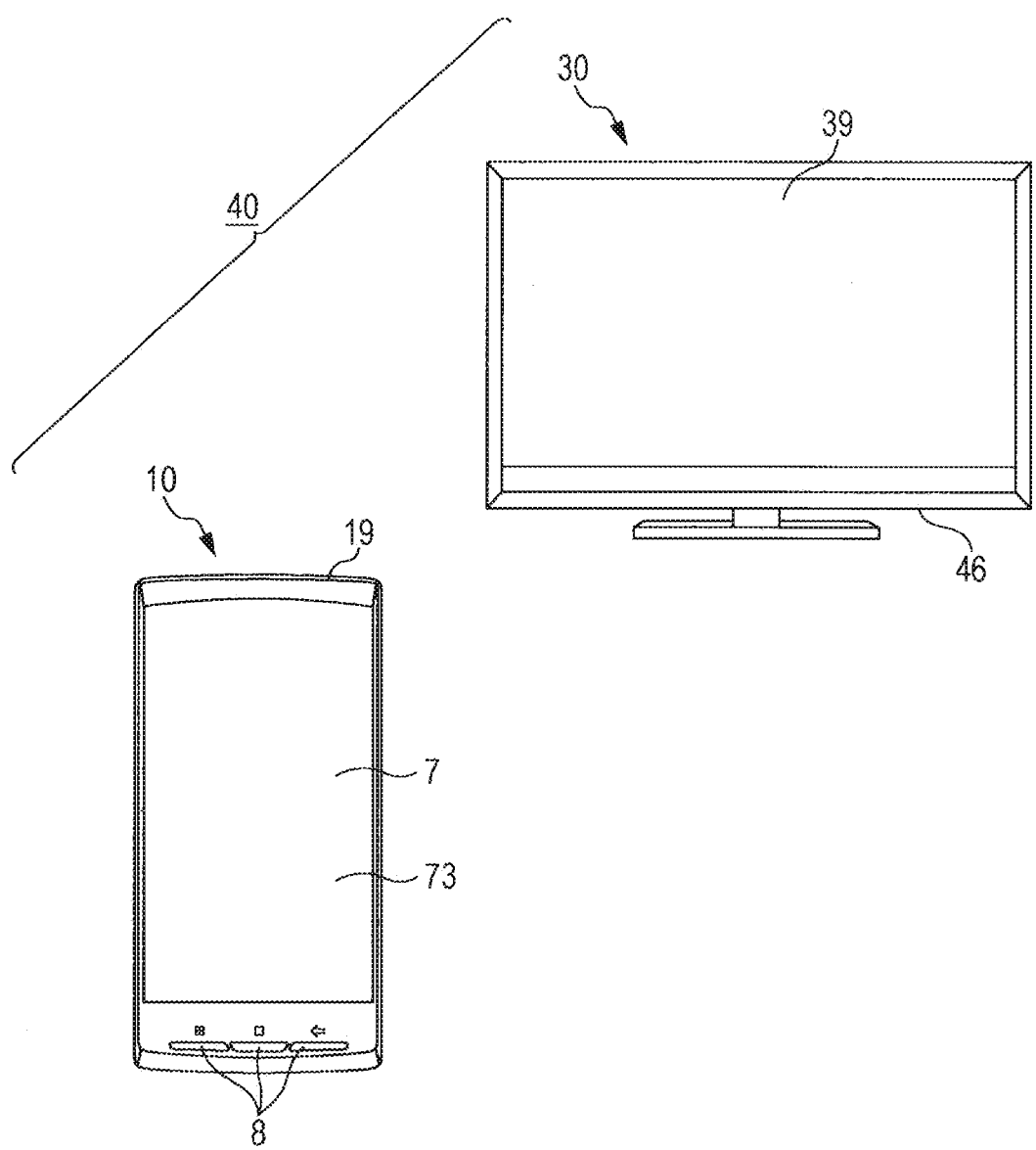
FIG. 1 is a schematic diagram illustrating an exemplary exterior configuration of an operation system according to an embodiment of the present disclosure.

Hereinafter, embodiments of the present disclosure will be described. Hereinafter, the description will proceed in the following order.
1. Exemplary exterior configuration of operation system
2. Exemplary internal configuration of mobile client device
3. Exemplary internal configuration of television
4. Input operation preconditions
5. Examples of specific operations
6. Exemplary processes by which a mobile client device issues operation commands The embodiments herein will be described using an example in which the present disclosure is applied to a mobile client device 10 that transmits operation commands generated according to operations on a touch panel 7 to a television 30. In the mobile client device 10, an operation method is realized by internal blocks to be discussed later working in conjunction with each other as a result of a computer executing a program.

[1. Exemplary Exterior Configuration of Operation System]

FIG. 1 is a schematic diagram illustrating an exemplary exterior configuration of a mobile client device 10 and a television 30 in an operation system 40. The operation system 40 is provided with a mobile client device 10, and a television 30 which functions as a display device that displays video.

The mobile client device 10 includes a case 19, a touch panel 7 housed in the front portion of the case 19, and operable keys 8 which may be provided on the lower part of the front of the case 19. Meanwhile, the television 30 includes a housing 46 and a display panel 39, which is housed in the front portion of the housing 46, and which functions as a display unit that displays a user interface such as menu screens, programs received from broadcasting stations, and video footage played back by an HDD recorder not illustrated.

The touch panel 7 is implemented as an input device by which a user performs input operations on a mobile phone client device, an advanced mobile information client equipped with telephony functions (commonly referred to as a smartphone), or a tablet device. The touch panel 7 may be realized with a capacitive sensor, for example. Additionally, the touch panel 7 is integrally formed with a touch sensor 71 that functions as a position input device which accepts the input of positions indicated by a pointing object such as a finger or stylus, and a display 73 that displays images, etc. The display 73 may be realized with an LCD panel or an organic EL (electro luminescence) panel, for example.

The following techniques may be used as the sensing technique by which the touch panel 7 detects input operations performed by a pointing object. For example, resistive techniques which detect resistivity changes in a portion contacted by a pointing object, electromagnetic induction techniques which detect the electromagnetic energy of a specialized pointing object that produces a magnetic field, and capacitive techniques which detect changes in the capacitance of a contacted portion are known. Herein, an example will be described in which a finger is used as the pointing object that performs input operations on the touch panel 7.

In a mobile client device 10 provided with a touch panel 7, given operations may be input by the user on various icons displayed on the screen of the display 73, thereby causing the various applications associated with those icons to operate according to the input operation type, for example. Known input operation types include tap operations that tap the surface of the touch panel 7, drag operations that move a finger contacting the touch panel 7 from a given position to another position, and flick operations that rapidly flick a finger across the screen.

These various input operations are determined on the basis of information regarding the coordinates on the screen where the finger or other pointing device are in contact or proximity during a series of operations from when the user's finger or other pointing device contact the screen until they are released. Specifically, information such as the coordinate variation per unit time, the coordinate translational velocity, and the screen surface area where touch is detected are used as information for identifying an input operation type.

[2. Exemplary Internal Configuration of Mobile Client Device]

Figure 2:
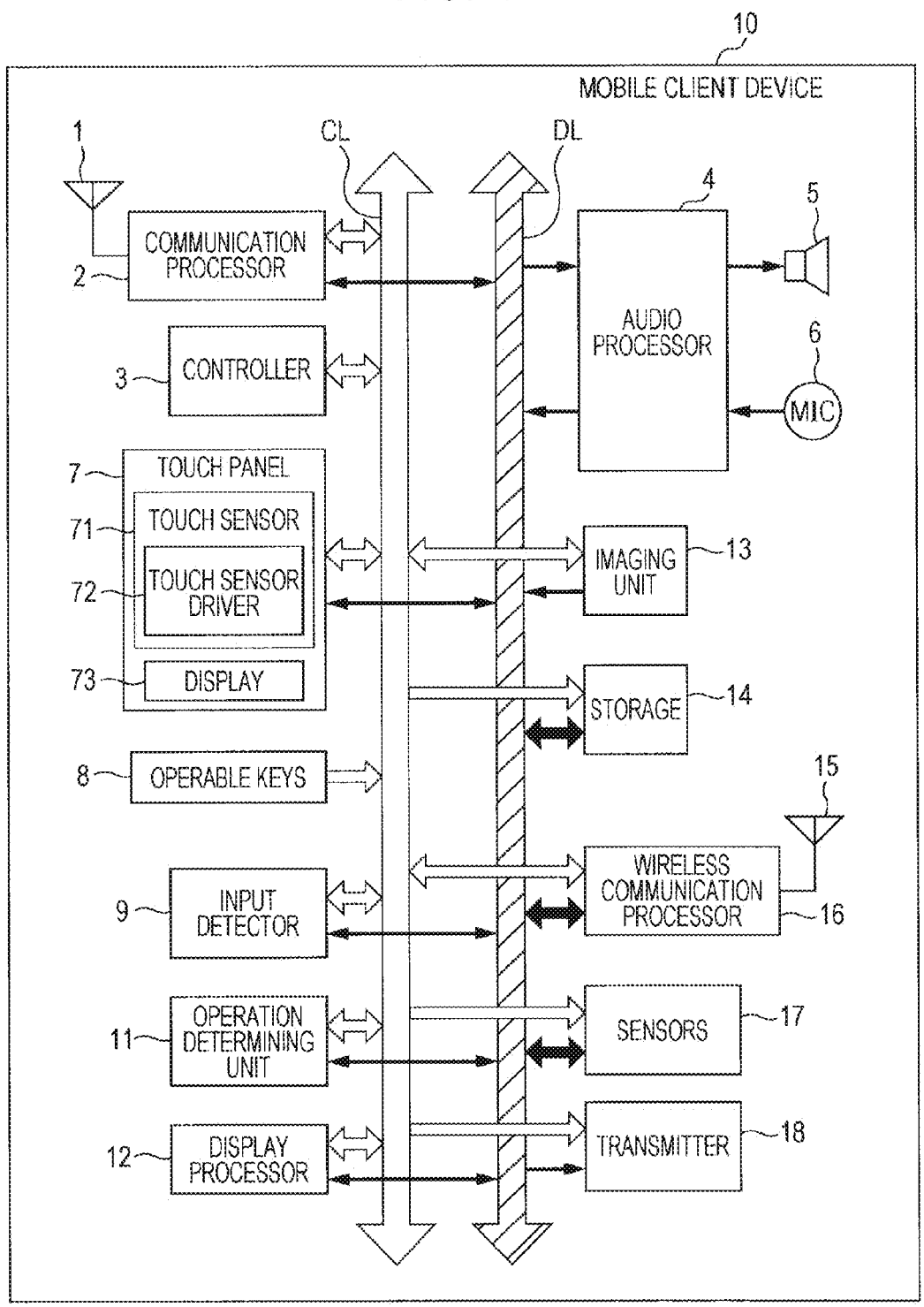
FIG. 2 is a block diagram illustrating an exemplary internal configuration of a mobile client device according to an embodiment of the present disclosure.

Next, an exemplary configuration of the mobile client device 10 will be described with reference to FIG. 2. FIG. 2 is a block diagram illustrating an exemplary internal configuration of a mobile client device 10. The mobile client device 10 is provided with an antenna 1 that transmits and receives radio waves to and from a wireless telephone base station, a communication processor 2 connected to the antenna 1, and a controller 3. Also provided are an audio processor 4, a speaker 5, and a microphone 6.

The communication processor 2 wirelessly communicates with a wireless telephone base station on the basis of control by the controller 3. During audio telephony, audio data included in data received by the communication processor 2 is supplied to the audio processor 4. Then, an audio data decoding process is conducted by the audio processor 4, and an analog audio signal is obtained. The analog audio signal obtained by the audio processor 4 is supplied to the speaker 5 and output as audio. An audio signal obtained as a result of audio pickup by the microphone 6 is also supplied to the audio processor 4, and the audio data is encoded by the audio processor 4 into a given encoding format. Then, the obtained audio data is supplied to the communication processor 2 and emitted as a wireless radio wave via the antenna 1.

Processors such as the communication processor 2 and the audio processor 4 exchange control data with the controller 3 via a control line CL, while also transmitting data via a data line DL. The controller 3 consists of a CPU (Central Processing Unit) and GPU (Graphics Processing Unit), etc., and controls the respective units constituting the mobile client device 10. For example, the controller 3 may change instructions issued to an application program stored in storage 14 discussed later, on the basis of an operation determination result given by an operation determining unit 11 discussed later.

The mobile client device 10 is also provided with a touch panel 7, operable keys 8, an input detector 9, an operation determining unit 11, and a display processor 12. Included in the touch panel 7 are a touch sensor 71, a touch sensor driver 72, and a display 73. The touch sensor 71 is realized by sensors which are of the mutual capacitive type of projected capacitance touch technology, in which transmit electrodes (TX) and receive electrodes (RX) not illustrated are arrayed in a matrix in the X and Y directions.

By grounding the receive electrodes and inputting a drive pulse into the transmit electrodes, an electric field is produced between the transmit electrodes and the receive electrodes. In the case where a pointing object such as the user's finger or a stylus (conducting object) approaches the surface of the touch panel 7 (hereinafter called the "operable surface"), the electric field between the transmit electrodes and the receive electrodes decreases, since a portion of the electric field is absorbed by the conducting object. Accordingly, the charge (capacitance) in the receive electrodes also decreases. Consequently, it is possible to detect contact and non-contact with respect to the operable surface of the touch panel 7 by measuring decreases in charge due to decreases in the electric field between the transmit electrodes and the receive electrodes.

The touch sensor driver 72 inputs drive pulses into each transmit electrode and detects the charge in the receive electrodes. The input detector 9 detects the contact and non-contact of a pointing object used to perform input operations on the operable surface of the touch panel 7 by measuring changes in the capacitance detected by the touch sensor driver 72. Additionally, the input detector 9 detects the position on the operable surface of the touch panel 7 where contact with or proximity to the pointing object is detected, and outputs XY coordinate information corresponding to this position.

The operation determining unit 11 determines the type of pointing object (such as a finger) in contact with or proximity to the operable surface of the touch panel 7 on the basis of the capacitance detected by the input detector 9, information on the distribution over the operable surface of the touch panel 7, and the magnitude of the capacitance, etc. Also, the operation determining unit 11 determines the type of input operation performed on the touch panel 7 by the pointing object, on the basis of coordinate information on the screen where the pointing object is in contact or proximity during a series of operations from when the pointing object contacts the screen until it is released. Types of user-performed input operations include tap operations, drag operations, and flick operations as discussed earlier, as well as pinch operations (pinch/spread) in which the spacing between two fingers is made wider or narrower. The operation determining unit 11 then sends the determined operation type to the controller 3.

The controller 3 generates operation commands that include instructions upon transitioning to a control mode that issues instructions for modifying the content displayed on a television 30 (in the present embodiment, this is the remote mode discussed later). The controller 3 also applies control causing the display processor 12 to display given screens.

The display processor 12, on the basis of control by the controller 3, conducts processing that causes screens related to executed applications to be displayed on the display 73. For example, on the basis of operation types performed on the operable surface of the touch panel 7, processing may be conducted to scroll a browser, etc. up or down, move a screen on the basis of a flick operation, and enlarge or reduce a selected area on the basis of a pinch operation.

The mobile client device 10 is also provided with an imaging unit 13, storage 14, an antenna 15, a wireless communication processor 16, sensors 17, and a transmitter 18. The imaging unit 13 is provided with an image sensor consisting of a CCD (Charge-Coupled Device) or CMOS (Complementary Metal-Oxide-Semiconductor), for example. Additionally, the imaging unit 13 generates an image signal by photoelectrically converting subject light focused onto its photosensor surface via a lens not illustrated, and is also used when imaging a picture displayed on the television 30 or the housing 19.

The storage 14 comprises ROM (Read-Only Memory) and RAM (Random Access Memory), and stores various application programs as well as data required when executing such application programs. The wireless communication processor 16 wirelessly communicates with nearby devices via the connected antenna 15 on the basis of a protocol conforming to a given communication standard.

The sensors 17 are configured to include an acceleration sensor and a geomagnetic sensor, etc. From the sensor output from an acceleration sensor, the operation determining unit 11 is able to compute operations in which the mobile client device 10 is lifted up or waved, and also compute the orientation in which the mobile client device 10 is being used. The transmitter 18 transmits operation commands generated by the controller 3 to the television 30. During such transmissions, the transmitter 18 modulates operation commands onto infrared signals according to an infrared communication protocol.

However, by connecting the mobile client device 10 and the television 30 to a LAN, etc., it may also be configured such that the mobile client device 10 transmits operation commands from the wireless communication processor 16 via the antenna 15. In this case, the user is still able to perform operations without orienting the mobile client device 10 in the direction of the television 30. In addition, the mobile client device 10 is able to ascertain the state of the television 30 by receiving operation command acknowledgments and information on status changes from the television 30.

[3. Exemplary Configuration of Television]

Next, an exemplary internal configuration of the television 30 in the present example will be described. FIG. 3 is a block diagram illustrating an exemplary internal configuration of a television 30. The television 30 uses an LCD panel as its display panel 39.

The television 30 is provided with an antenna 31, input units 32a to 32c, a tuner 32d, a switching unit 33 that switches the inputs from the input units 32a to 32c or the tuner 32d, an audio processor 34, an audio amp 35, and speakers 36. The television 30 is also provided with a video processor 37, a display driver 38, a display panel 39, a controller 41, an operable unit 42, a receiver 43, and memory 44.

The television 30 may, for example, receive broadcast waves from digital terrestrial TV broadcasts, and select a desired broadcasting station with the tuner 32d, which conducts channel selecting and tuning processes. The video signal and audio signal selected by the tuner 32d are then supplied to the switching unit 33, which switches inputs. The television 30 of the present example is provided with three input terminals besides the antenna terminal connected to the tuner 32d, making it possible to supply video signals and audio signals from external electronic devices connected to the television 30 via any of the input units 32a to 32c. It is configured such that when the user views a program, the input of the television 30 is switched and one of the input units 32a to 32c or the tuner 32d is selected.

Video signals and audio signals output by external devices installed externally to the television 30 are input into the switching unit 33 of the television 30, with the input units 32a to 32c acting as respective connecting terminals. The controller 41, comprising an MPU (microprocessor unit) or other computing circuit, controls processing by the television 30 and conducts memory management of the memory 44 where programs and parameters are saved. The memory 44 comprises rewriteable RAM (Random Access Memory), for example, and is able to store details on previous input operations and broadcast images.

For video playback, a video signal supplied by the switching unit 33 is detected and demodulated by the video processor 37, and the video signal obtained by demodulation is supplied to the display driver 38. The display driver 38 consists of an LCD controller that drives an LCD, and generates a driving signal for LCD pixels on the basis of a video signal. At this point, the display driver 38 is configured to display color images by individually driving LCD pixels provided in an active matrix display panel 39, for example.

For audio playback, an audio signal supplied by the switching unit 33 is detected and demodulated by the audio processor 34. The audio signal that has been demodulated by the audio processor 34 is then amplified by the audio amp 35 and emitted from the two speakers 36.

Input operations performed from an operable panel, which is not illustrated but is installed on the front of the television 30, are conducted via the operable unit 42, which is provided with various keys. Meanwhile, the receiver 43 comprises a phototransistor or photodetector, etc., and receives operation commands from the mobile client device 10 which have been modulated onto an infrared signal and which include instructions for modifying the content displayed on the display panel 39. Then, after photoelectrically converting an infrared signal received from the mobile client device 10, the receiver 43 supplies the demodulated and processed operation command to the controller 41, thereby causing the controller 41 to conduct given processing.

[4. Input Operation Preconditions]

Next, exemplary operations on the mobile client device 10 which are suited to operations on the television 30 will be described. First, fulfillment of the following two rules is considered necessary in order for the user to comfortably operate a television. Furthermore, these rules are considered to respectively correspond to touch operations suited to operations on the television 30 as indicated below.

(1) The user does not look at the touch panel 7 of the mobile client device 10 every time an operation is performed while viewing the display panel 39. For this reason, it is desirable for all information necessary to operation to be displayed on the display panel 39. For example, if operable icons and buttons, etc. are displayed on the touch panel 7, the user must check the positions of the icons and buttons, etc. displayed on the touch panel 7 every time an operation is performed. Causing the user to be consciously aware of which positions he or she is touching on the touch panel 7 in this way can potentially become a factor that decreases usability in the case of using a mobile client device 10 as a remote control.

(2) When using a mobile client device 10 as a remote control, the user does not operate the mobile client device 10 with both hands as one would operate a portable game console, and therefore it is desirable to enable one-handed operation. For example, suppose a situation in which the user is operating a mobile client device 10 with one hand in a relaxed state while reclining deeply on a sofa. When the user grips the mobile client device 10 in such a situation, the only digit able to operate the touch panel 7 will be the thumb, and thus it is desirable to enable operation with one thumb. Meanwhile, in the case of operating a mobile client device 10 left in place on a table, etc., it is desirable to enable operation with one forefinger, for example.

On the basis of an examination of the above rules and touch methods, the details given in the following (1) to (3) will be examined as ideal examples of operating a remote control in which touch operations are used to indicate operations.

(1) The display of icons, etc. on the touch panel 7 is eliminated as much as possible, and all information required for input operations is displayed on the display panel 39.

(2) Also, the icons, etc. displayed on the display panel 39 are displayed moving smoothly in sync with operations on the touch panel 7.

(3) Operations on the touch panel 7 are configured such that, wherever possible, the user need not be consciously aware of the coordinates where his or her finger contacts the operable surface of the touch panel 7.

Concepts which are important for enabling the user to perform touch operations without being consciously aware of the coordinates on the operable surface will now be described on the basis of an examination of the above (1) to (3).

Figure 4A:
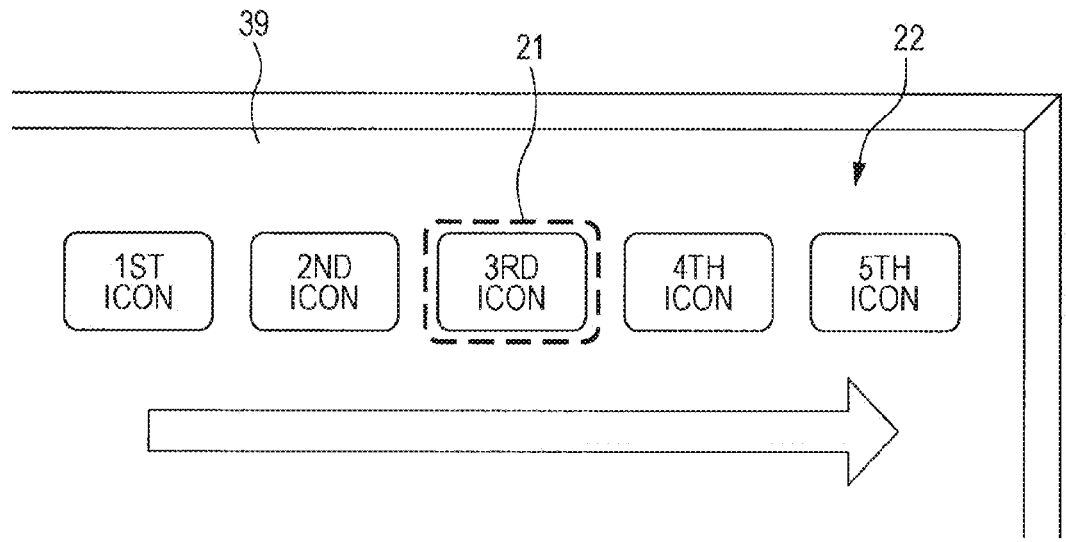
FIGS. 4A and 4B are explanatory diagrams illustrating an exemplary menu screen displayed on a display panel of a television according to an embodiment of the present disclosure.
Figure 4B:
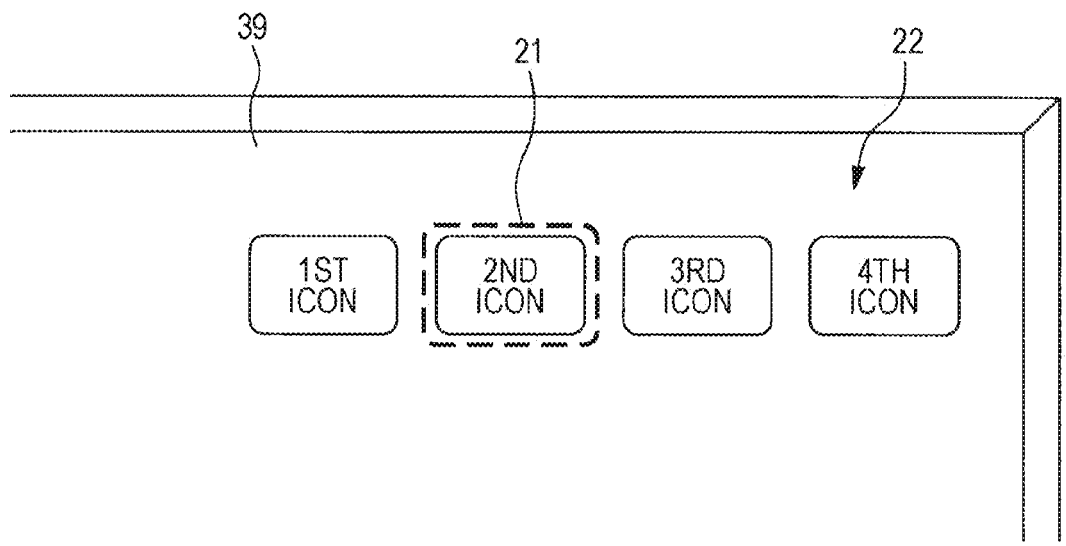

FIGS. 4A and 4B are explanatory diagrams illustrating an exemplary menu screen displayed on the display panel 39 of the television 30. FIG. 4A illustrates an exemplary display before selectable icons 22 are moved, while FIG. 4B illustrates an exemplary display after selectable icons 22 are moved to the right.

In order to keep the user from becoming consciously aware of the position where his or her finger contacts the operable surface of the touch panel 7, a pointer such as a mouse or a menu screen in which arbitrary places are selected with tap operations as in a smartphone are not suitable. For this reason, it is desirable to present a display in which a cursor for selecting icons is kept stationary at a given place on the display panel 39, while icons move when making a selection.

On the display panel 39 of the television 30 illustrated in FIG. 4A, a plurality of icons representing categories of operable targets are displayed arranged in a given direction, and a cursor for selecting icons is kept stationary and displayed at a given position. For example, a plurality of selectable icons 22 (first through fifth icons) indicating the names of broadcasting stations or the names of input devices which can be received by the television 30 may be displayed on the display panel 39, the selectable icons 22 being movable in the horizontal direction. Additionally, a selecting cursor 21 indicated by broken lines is highlighted near the center of the screen.

On the basis of an input operation performed on the touch panel 7, the controller 3 issues instructions for moving the selectable icons 22, and generates an operation command whereby a selectable icon 22 is chosen by the selecting cursor 21. As illustrated in FIG. 4B, it is the selectable icons 22 that move according to an operation performed using the mobile client device 10, whereas the selecting cursor 21 does not move position and remains stationary. One of the selectable icons 22 can be chosen if the user performs a tap operation after a selectable icon 22 moves inside the selecting cursor 21 due to a flick operation performed by the user on the touch panel 7.

In addition, the specific instructions that can be issued to the television 30 with a single input operation are always taken to be the same. For example, a tap operation performed near the center of the display panel 39 is always assigned to "OK". In so doing, the user is able to choose a menu item or program without being consciously aware of the coordinates of his or her finger on the touch panel 7.

Figure 5A:
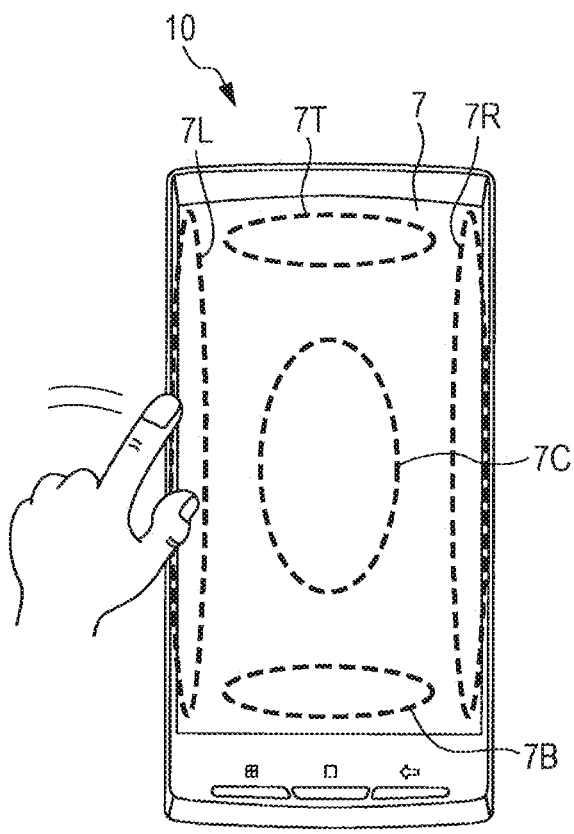
FIGS. 5A and 5B are explanatory diagrams illustrating exemplary operations possible when using a mobile client device according to an embodiment of the present disclosure as a remote control.
Figure 5B:
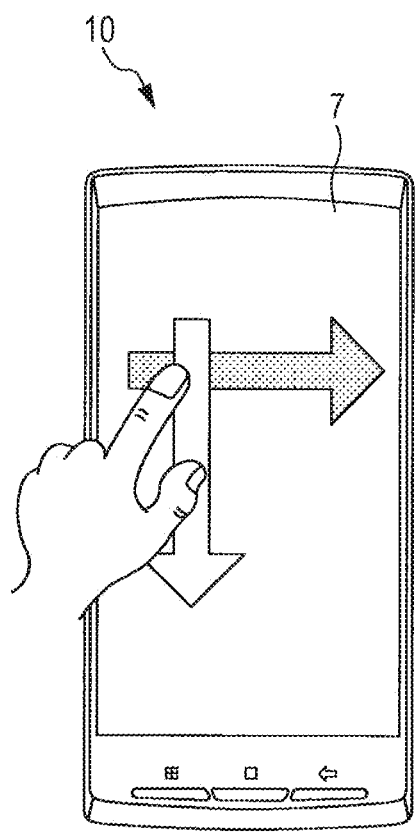

FIGS. 5A and 5B are explanatory diagrams illustrating exemplary operations possible when using the mobile client device 10 as a remote control. FIG. 5A illustrates examples of tap operations, while FIG. 5B illustrates examples of flick operations.

FIG. 5A illustrates an example in which five detection areas for detecting input operations performed by a pointing object have been set on the touch panel 7. A top area 7T, a bottom area 7B, a left area 7L, a right area 7R, and a center area 7C are set as the five detection areas. Additionally, the operation determining unit 11 generates different operation commands depending on the position of the detection area with which a pointing object makes contact.

Meanwhile, tap operations performed on the touch panel 7 include tap operations performed one time as well as tap operations performed multiple times (also called double taps). However, in cases such as when the user selects a desired item on a menu screen or options screen, it is necessary for the user to always be able to perform the same operation.

The flick operations illustrated in FIG. 5B are simplified and performed either horizontally or vertically, and thus the operation determining unit 11 determines whether the operation direction is either horizontal or vertical. Note that although an example of setting five detection areas on the touch panel 7 is described, a plurality of detection areas which are less than five or six or more may also be set.

Figure 6A:
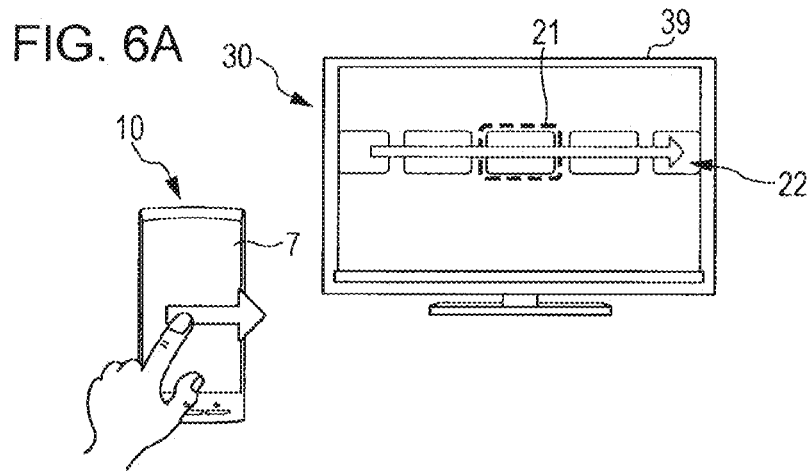
FIGS. 6A-6D are explanatory diagrams illustrating various menu screen display examples displayed on a display panel of a television according to an embodiment of the present disclosure.
Figure 6B:
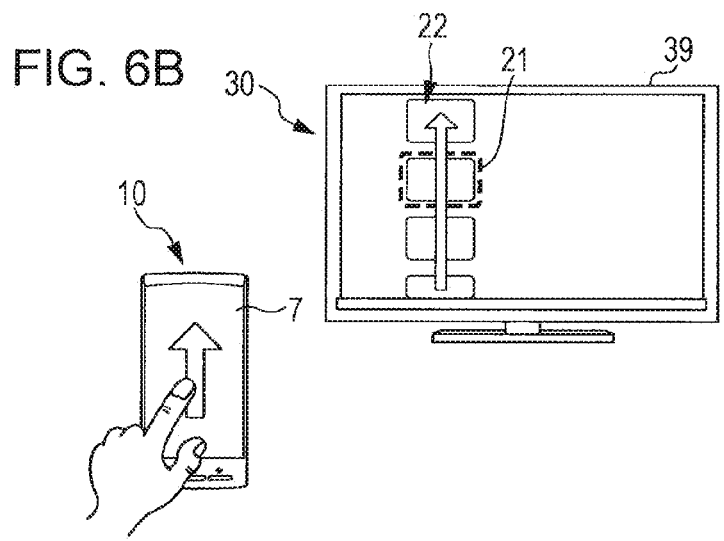
Figure 6C:
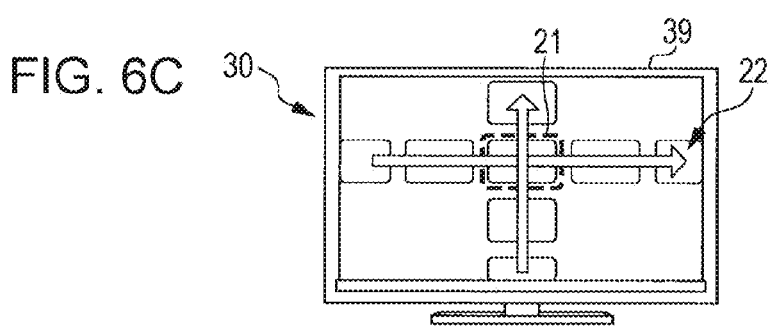
Figure 6D:
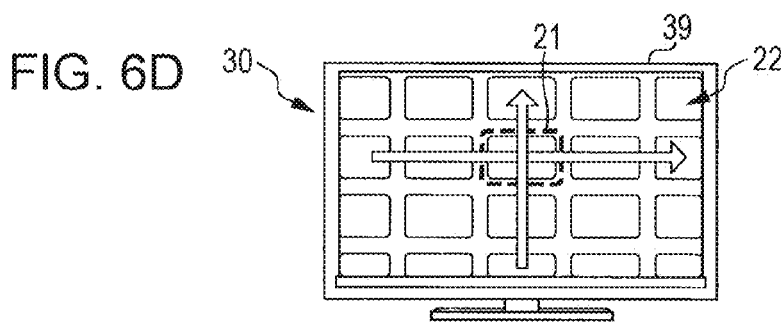

FIGS. 6A-6D are explanatory diagrams illustrating various menu screen display examples displayed on the display panel 39. FIG. 6A illustrates an example in which selectable icons 22 are displayed in a single line arranged horizontally, while FIG. 6B illustrates an example in which selectable icons 22 are displayed in a single line arranged vertically. Meanwhile, FIG. 6C illustrates an example in which selectable icons 22 are displayed in respective single lines arranged horizontally and vertically (cross display), while FIG. 6D illustrates an example in which selectable icons 22 are displayed in a plurality of lines arranged horizontally and vertically (grid display).

With the menu screen illustrated in FIG. 6A, if a finger is swept left or right over the surface of the touch panel 7, the selectable icons 22 displayed on the display panel 39 move in the same left or right direction as the finger. With the menu screen illustrated in FIG. 6B, if a finger is swept up or down over the surface of the touch panel 7, the selectable icons 22 displayed on the display panel 39 move in the same up or down direction as the finger.

Also, on the menu screen in FIGS. 6C and 6D, a plurality of selectable icons 22 are displayed on the display panel 39 arranged above, below, and to the left and right of the selecting cursor 21. Even in these cases, the selectable icons 22 can be moved up, down, left, or right while keeping the position of the selecting cursor 21 stationary and a desired selectable icon 22 can be chosen by combining the operations illustrated in FIGS. 6A and 6B. Herein, the menu screen illustrated in FIG. 6C is known as the XrossMediaBar (registered trademark), and has a high affinity as a menu screen adaptable to operations performed using a mobile client device 10 according to the present embodiment.

[5. Examples of Specific Operations]

Next, examples of specific operations using the mobile client device 10 will be described with reference to FIGS. 7 to 13.

FIG. 7 is an explanatory diagram illustrating an exemplary operation in which the mobile client device 10 is used to activate the television 30. When using the mobile client device 10 as a remote control for operating the television 30, a remote control application program for that purpose is launched as a result of an operable icon 7a being touched. Once the application program is launched, the mobile client device 10 transmits an activation command to the television 30. The television 30, which is in a power off state at this point, is then powered on by the operation on the mobile client device 10 and displays a picture.

FIG. 8 is an explanatory diagram illustrating an exemplary operation for changing programs (stations) displayed on the display panel 39. If a finger is swept to the left or right from the center area 7C of the touch panel 7 while pointing the mobile client device 10 towards the television 30, the station displayed on the display panel 39 is changed. In the following description, an action that rapidly moves a pointing object in a sweeping motion across the touch panel 7 and separates the pointing object from the touch panel 7 without stopping will be designated a "swipe". Selectable icons 22 move to match the motion of swipes across the touch panel 7 made in this way.

Each time the user swipes to the right across the touch panel 7, the program displayed on the display panel 39 is changed in order from a station D, to a station A, to a station C. Herein, the changing of programs is conducted one channel at a time and not by skipping multiple channels. Furthermore, although not illustrated in the drawings, if the user swipes to the left across the touch panel 7, the program is changed in order from the station C, to the station A, to the station D.

FIG. 9 is an explanatory diagram illustrating an exemplary operation for displaying a program list 24. If an upward swipe starting from the bottom area 7B is made across the operable surface of the touch panel 7 while pointing the mobile client device 10 towards the television 30, the picture size is reduced for the station currently being displayed fullscreen on the display panel 39. Although the picture for station A is decreased to a reduced picture 23 at this point, the audio corresponding to the program on station A continues to play as-is. At the same time, a program list 24 for the current time block is displayed for each station in the lower part of the display panel 39. This program list 24 may comprise thumbnail images (still images or moving images) representing programs.

FIG. 10 is an explanatory diagram illustrating an exemplary operation for changing programs. Continuing on from the operation illustrated in FIG. 9 above, if the user swipes to the right from the center area 7C across the touch panel 7, the user can change the program of the station he is she is trying to switch to from the program list 24. At this point, the program list 24 slides to match the swiped direction. The station name at the center of the program list 24 now becomes the program selected by the user. A selecting cursor 25 is always disposed in the center of the screen, and when the program that the user wants to watch is aligned with the selecting cursor 25, the user performs a tap operation in the center area 7C of the touch panel 7 to choose the program. After that, the selected program is displayed fullscreen on the display panel 39.

FIG. 11 is an explanatory diagram illustrating an exemplary operation performed when activating a menu screen. A menu screen is activated if the center area 7C is rapidly tapped twice while pointing the mobile client device 10 in the direction of the television 30. On this menu screen are displayed icons for switching among digital terrestrial, digital 13S (Broadcasting Satellite), and digital CS (Communications Satellite) broadcasting. Besides the above, icons are also displayed for switching inputs from DVD players and audio playback devices, etc. and for launching various application programs. Respective icons are collectively managed separately under digital terrestrial and digital BS, for example, and it is possible to change the station and channel number, etc.

FIG. 12 is an explanatory diagram illustrating exemplary operations performed when operating a menu screen. After activating the menu screen with the operation illustrated in FIG. 11 above, the user can swipe his or her finger up, down, left, or right from the center area 7C of the touch panel 7, thereby causing the icons to move in the same direction as the finger. During such icon movement, the icons do not move one at a time, but rather a plurality of icons all move at once. Meanwhile, the selecting cursor 25 is always displayed in a stationary position near the center of the display panel 39. A program is then chosen by tapping the center area 7C of the touch panel 7. Note that to return to the menu screen, the user may simply double-tap the center area 7C of the touch panel 7 once again.

Figure 13:
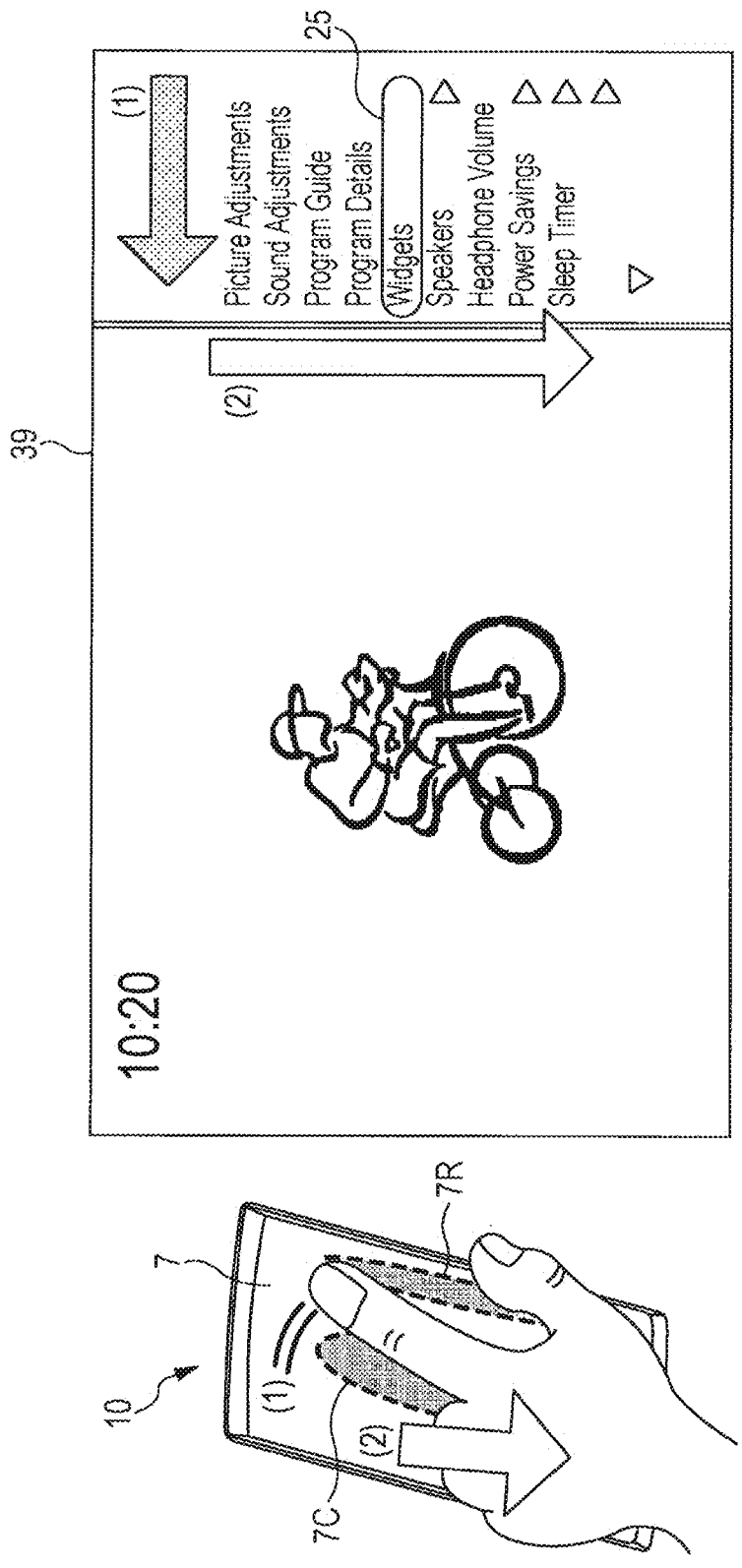
FIG. 13 is an explanatory diagram illustrating an exemplary operation for displaying an options screen according to an embodiment of the present disclosure.

FIG. 13 is an explanatory diagram illustrating an exemplary operation for displaying an options screen.

(1) First, an options function is activated when the user taps the right area 7R of the touch panel 7. At this point, the options screen appears by moving in a leftward direction from the right edge of the display panel 39 of the television 30.

(2) Next, if the user swipes upward or downward from the center area 7C of the touch panel 7, items included on the menu screen correspondingly move upward or downward in the swiped direction. Likewise in this case, the selecting cursor 25 is always displayed in a stationary position near the center of the display panel 39. A program is then chosen by tapping the center area 7C of the touch panel 7. Note that to return to the previous screen, the user may tap the right area 7R on the screen of the touch panel 7 once again, causing the displayed options screen to disappear.

[6. Exemplary Processes by which a Mobile Client Device Issues Operation Commands]

Figure 14:
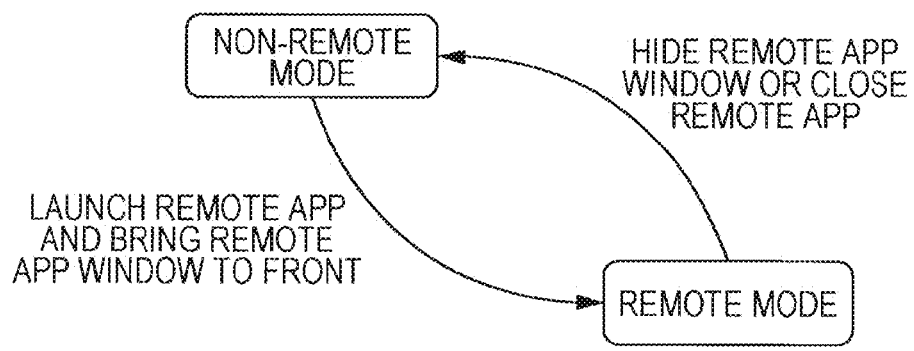
FIG. 14 is an explanatory diagram illustrating exemplary operating modes which are switched between in a mobile client device according to an embodiment of the present disclosure.

Next, exemplary internal processes of the mobile client device 10 will be described. FIG. 14 is an explanatory diagram illustrating exemplary operating modes which are switched between in the mobile client device 10. Herein, "remote mode" is used to refer to the operating mode of the mobile client device 10 in the case of activating an application program that uses the mobile client device 10 as a remote control (hereinafter abbreviated to the "remote app"). Meanwhile, "non-remote mode" is used to refer to the operating mode of the mobile client device 10 in the case where the mobile client device 10 is not used as a remote control. It is possible to switch between remote mode and non-remote mode by performing a long press (pressing with a finger for two or more seconds, for example) at the center (center area 7C) of the touch panel 7, for example. Mode switching is controlled by the controller 3.

When transitioning from non-remote mode to remote mode, the mobile client device 10 launches the remote app and starts remote mode by bringing a remote app window (the active window, for example) to the front of the display 73 (touch panel 7). Remote mode is made to transition to non-remote mode by hiding the remote app window behind another application program or ending the remote app.

However, in the case where the mobile client device 10 is configured as a tablet device and the touch panel 7 is a large-sized screen, it is possible to have other application programs besides the remote app operating alongside it when remote mode is transitioned to non-remote mode. It is also possible to display icons and windows indicating that other application programs are activated alongside the icons and windows displayed while the remote app is active.

Figure 15:
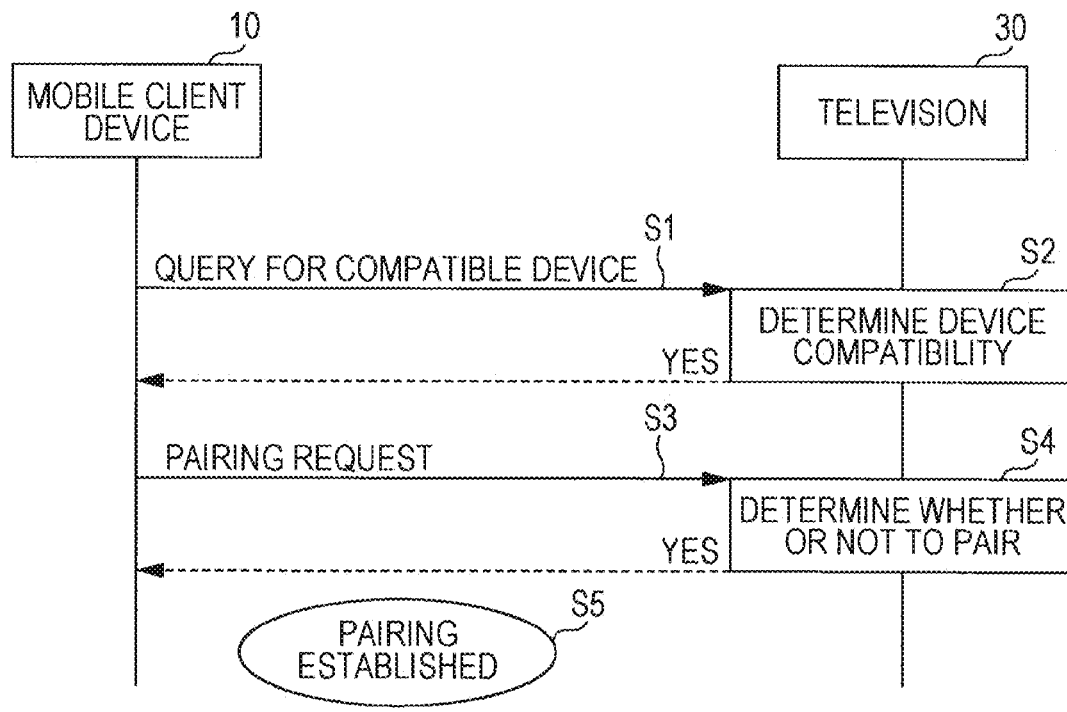
FIG. 15 is a sequence diagram illustrating an exemplary process according to an embodiment of the present disclosure, in which a mobile client device queries a television.

FIG. 15 is a sequence diagram illustrating an exemplary process in which the mobile client device 10 queries the television 30. Herein, this inquiry process is conducted in the case where the mobile client device 10 and the television 30 are both connected on a network. For this reason, this process is not conducted for infrared communication protocols in which the mobile client device 10 transmits operation commands to the television 30 in a one-way manner.

Herein, the two conditions indicated below must be fulfilled in order to establish a pairing between the mobile client device 10 and the television 30.

First, to support operation commands transmitted by the mobile client device 10, including the communication protocol, both the television 30 and the mobile client device 10 must be devices which are compatible with a given communication standard (such as Bluetooth (registered trademark), for example).

Second, the television 30 must not be currently paired with another remote control.

When the operating mode of the mobile client device 10 transitions to remote mode, the mobile client device 10 queries the television 30 to ask whether the television 30 is a compatible device that can be remote controlled (step S1). This inquiry is conducted for all electronic devices in the vicinity of the mobile client device 10, and the mobile client device 10 waits for a response from a compatible device.

In accordance with the first condition, the television 30 determines whether itself is a compatible device that can be operated by the mobile client device 10, and replies to the mobile client device 10 with the determination result (step S2). Next, upon receiving a determination result indicating that the television 30 is a compatible device, the mobile client device 10 requests to pair with the television 30 in order to determine the second condition (step S3).

In accordance with the second condition, at this point the television 30 determines whether itself is not currently paired to another remote control and is able to pair with the mobile client device 10 (step S4). If pairing is possible, the determination result is sent to the mobile client device 10 in reply. After that, the mobile client device 10 and the television 30 pair together and a pairing is established (step S5).

Although pairing is the first process conducted upon transitioning from non-remote mode to remote-mode herein, it may also be configured such that pairing with the television 30 is conducted in advance on the home screen (default screen) of the mobile client device 10 in non-remote mode. In this case, since pairing is already completed, it is possible to immediately use the mobile client device 10 as a remote control upon transitioning to remote mode.

FIGS. 16A and 16B are explanatory diagrams illustrating touch operations performed on the touch panel 7 and exemplary operations on selectable icons 22 displayed on the television 30. FIG. 16A illustrates an example of moving selectable icons 22, while FIG. 16B illustrates an exemplary table associating movements of a finger on the touch panel 7 with movements of selectable icons 22.

In FIG. 16A, selectable icons 22 are displayed arranged on all or part of the screen of the display panel 39, and an exemplary operation for selecting one selectable icon 22 is illustrated. As illustrated in FIGS. 6A-6D discussed earlier, the position of the selecting cursor 25 is stationary, while the selectable icons 22 positioned behind the selecting cursor 25 move according to the movements of a finger on the touch panel 7.

The table illustrated in FIG. 16B is set such that the plurality of selectable icons 22 all move up if the finger is moved up on the touch panel 7, and the plurality of selectable icons 22 all move down if the finger is moved down. It is also set such that the plurality of selectable icons 22 all move left if the finger is moved left on the touch panel 7, and the plurality of selectable icons 22 all move right if the finger is moved right.

FIG. 17 is an explanatory diagram illustrating a precondition for a process in which an operation performed on the touch panel 7 is converted into an operation command for the television 30 and transmitted to the television 30. Operation commands corresponding to operations for moving the selectable icons 22 displayed on the television 30 only include instructions for movement, such as "move right" or "move down". For this reason, an operation command transmitted by a single swipe operation across the touch panel 7 includes just one movement direction from among up, down, left, and right. Converting coordinate information acquired from an operation performed on the touch panel 7 into an operation command requires some creativity.

The operation determining unit 11 in a mobile client device 10 according to the present embodiment determines finger movement on the basis of time-based change in the coordinate information for a finger contacting the touch panel 7. The controller 3 then converts the determined finger movement into an operation command according to the finger movement direction and translational magnitude. However, the controller 3 also sets a threshold value for the finger translational magnitude (discussed later with reference to FIG. 20), and the wireless communication processor 16 transmits an operation command under control by the controller 3 if the translational magnitude reaches the threshold value.

FIGS. 18A and 18B are explanatory diagrams illustrating examples of converting finger movement directions into operation commands. FIG. 18A illustrates an example in which a finger moves diagonally downward across the touch panel 7, while FIG. 18B illustrates exemplary operation areas used in order to determine the finger movement direction.

The operation determining unit 11 takes the position where a finger (pointing object) contacts the touch panel 7 in a detection area set on the touch panel 7 as the origin, and detects that the direction in which the finger moves while contacting the touch panel 7 is within a given range with respect to a reference axis centered about the origin. At this point, the controller 3 generates an operation command instructing movement in a direction parallel to the reference axis.

Specifically, in the case of taking the coordinates where a finger contacts the touch panel 7 as a center C, respective reference axes are defined in which the rightward direction on the screen is the $\Delta x$ axis, and the downward direction is the $\Delta y$ axis. The operation determining unit 11 determines the finger movement direction on the basis of position information in respective areas enclosed by line segments that respectively extend at $\pm 45°$ and pass through the center C. Herein, the center C is determined at the time of first contacting the touch panel 7, and the center C is locked to the initial coordinates even if the finger moves thereafter.

Herein, line segments are defined with reference to angles with respect to the $\Delta x$ axis. In this case, if the operation determining unit 11 detects a finger movement direction in the 0° to +45°, 0° to −45° area equivalent to the x direction operation area 50, the controller 3 converts the result into an operation command that moves the selectable icons 22 in the +x direction (to the right). Meanwhile, if the operation determining unit 11 detects a finger movement direction in the +135° to +180°, −135° to −180° area equivalent to the x direction operation area 50, the controller 3 converts the result into an operation command that moves the selectable icons 22 in the −x direction (to the left).

Also, if the operation determining unit 11 detects a finger movement direction in the +45 to +135° area equivalent to the y direction operation area 51, the controller 3 converts the result into an operation command that moves the selectable icons 22 in the −y direction (upward). Meanwhile, if the operation determining unit 11 detects a finger movement direction in the −45° to −135° area equivalent to the y direction operation area 51, the controller 3 converts the result into an operation command that moves the selectable icons 22 in the +y direction (downward).

As discussed above, an operation command transmitted by the transmitter 18 with a single operation only includes information regarding movement in a single direction. For this reason, the mobile client device 10 transmits the operation command computed from the direction with the largest translational magnitude. At this point, given the two mutually orthogonal reference axes with the origin set at the center C, the operation determining unit 11 takes the track through which a finger (pointing object) moved while contacting the touch panel 7, separates the track into directions parallel to the reference axes, and compares the translational distance thus computed for each direction parallel to the reference axes. Then, the controller 3 generates an operation command indicating the direction parallel to the reference axis with the greater translational distance.

For this reason, even if a finger is swiped diagonally downward and to the right after contacting the touch panel 7, the operation determining unit 11 will determine that the finger moved downward (the +y direction), for example, in the case where the translational magnitude of the finger is greater in the downward direction than the rightward direction. At this point, the controller 3 generates an operation command that moves the selectable icons 22 downward, and the operation command is transmitted from the wireless communication processor 16.

Although the two directions of a Δx axis and a Δy axis are used as reference axes in the present embodiment, just one direction from between the Δx axis and the Δy axis may be set as a reference axis. In this case, a direction parallel to the reference axis can be quickly determined from the movement direction of a swiped finger. For this reason, the processing conducted by the operation determining unit 11 can be reduced in the case where the selectable icons 22 are arranged in just one direction.

FIGS. 19A and 19B are explanatory diagrams illustrating an example of adjusting the numerical value of an operation command according to a finger translational magnitude. FIG. 19A illustrates an example of projecting a finger translational magnitude onto the Δx and Δy axes, while FIG. 19B illustrates examples of a dead zone and operation command transmit areas which are used in order to determine the translational magnitude of a finger.

The center C and the Δx and Δy axes illustrated in FIG. 19 match those illustrated in FIG. 18 discussed above. The circular area with approximately a 5 mm diameter centered on the center C is defined as a dead zone 52. Within the dead zone 52, i.e., within a given distance range (such as 2.5 mm, for example) from the center C indicated as the origin by a pointing object, the controller 3 does not generate operation commands, even if the finger contacting the touch panel 7 moves. The size of the dead zone 52 is computed from the size of the contact surface of the finger contacting the touch panel 7. The dead zone 52 is used so that operation commands are not mistakenly transmitted due to a finger trembling slightly as it is made to contact the touch panel 7, for example.

The controller 3 then generates an operation command when the pointing object exceeds the range of a given distance. Specifically, when a finger moves out of the dead zone 52 while contacting the touch panel 7, the controller 3 generates an operation command at the moment when the finger exits the dead zone 52. Subsequently, after the finger exceeds the range of a given distance, or in other words exits the dead zone 52, the wireless communication processor 16 transmits operation commands at a given interval (every 2.5 mm, for example). Also, the time during which the finger contacts the touch panel 7 inside the dead zone 52 is required to be at least 0.5 s or greater. Doing so helps prevent operation commands from being mistakenly transmitted when the user unintentionally touches the touch panel 7.

Outside of the dead zone 52, circles with diameters of approximately 10 mm and 20 mm centered about the center C are defined, and an operation command transmit area 53 is defined for each of these circles. Similarly to the circular dead zone 52, these circles are provided in order to transmit operation commands at the moment when a finger moving from the center C crosses a circle.

For this reason, every time a finger crosses respective circles for which an operation command transmit area 53 is defined, a number of operation commands equal to the number of circle crossings by the finger are transmitted to the television 30 from the wireless communication processor 16. In so doing, the mobile client device 10 transmits the same operation command multiple times to the television 30, ensuring that the television 30 can be reliably operated.

Similarly to the example of generating an operation command illustrated in FIG. 18, an operation command issued with a single operation is only for one direction, and thus the mobile client device 10 transmits an operation command computed from the direction with the greater translational magnitude. For this reason, although a finger has moved in both the +Δx and +Δy directions on the touch panel 7 illustrated in FIG. 19A, only an operation command indicating the +Δy direction having the greater translational magnitude is transmitted to the television 30.

FIG. 20 is a flowchart illustrating an exemplary process of converting a touch operation into an operation command. This flowchart describes the case where a dead zone 52 like that illustrated in FIG. 19 is omitted and just one circle defining an operation command transmit area 53 is provided.

Once the mobile client device 10 transitions to remote mode, the touch panel 7 scans the panel surface and samples output signals from the touch panel 7 (every few dozen milliseconds, for example). Note that the sampling period may be increased beyond several dozen milliseconds. In such cases, power consumption from a battery not illustrated in the drawings but provided in the mobile client device 10 can be reduced.

When a finger contacting the touch panel 7 is detected by the input detector 9, the operation determining unit 11 computes the initial coordinates of the finger contacting the touch panel 7 as start coordinates (x0, y0), and saves them in the storage 14 as start coordinates 14a (step S11). The start coordinates 14a are cleared when the finger leaves the touch panel 7, and new initial coordinates are updated when the finger once again contacts the touch panel 7.

Next, after a given amount of time elapses, the touch panel 7 once again scans the panel surface, and the operation determining unit 11 computes the present coordinates of the finger that has moved while contacting the touch panel 7 as current coordinates (x, y), and saves them in the storage 14 as current coordinates 14b (step S12). The current coordinates 14b are continually updated with present coordinates computed at a given period while the finger is contacting the touch panel 7.

Next, the operation determining unit 11 computes the translational distance d of the finger contacting the touch panel 7 (step S13). The translational distance d is computed according to the following Eq. 1, a formula for the distance between two points, on the basis of the current coordinates 14b and the start coordinates 14a read out from the storage 14.

[Math. 1]

$$d = \sqrt{(x-x_0)^2 + (y-y_0)^2} \quad (1)$$

Next, the operation determining unit 11 determines whether or not the translational distance d is equal to or greater than a threshold value (step S14). If the translational distance d is less than the threshold value, the processing in steps S12 to S14 is repeated. If the translational distance d is equal to or greater than the threshold value, the translational distance in the x direction of the finger that contacted the touch panel 7 is compared to its translational distance in the y direction (step S15).

If the translational distance in the x direction is less than the translational distance in the y direction, the operation determining unit 11 determines whether or not the difference between the current coordinate y and the start coordinate y0 in the y direction is equal to or greater than 0 (step S16). If the difference between the current coordinate y and the start coordinate y0 is equal to or greater than 0, it can be determined that the finger has moved downward across the touch panel 7. At this point, the controller 3 generates an operation command that moves the selectable icons 22 down, and the operation command is transmitted from the wireless communication processor 16 to the television 30 (step S17).

If the difference between the current coordinate y and the start coordinate y0 is less than 0, the operation determining unit 11 is able to determine that the finger has moved upward across the touch panel 7. At this point, the controller 3 generates an operation command that moves the selectable icons 22 up, and the operation command is transmitted from the wireless communication processor 16 to the television 30 (step S18).

In step S15, if the translational distance in the x direction is equal to or greater than the translational distance in the y direction, the operation determining unit 11 determines whether or not the difference between the current coordinate x and the start coordinate x0 in the x direction is equal to or greater than 0 (step S19). If the difference between the current coordinate x and the start coordinate x0 is equal to or greater than 0, it can be determined that the finger has moved to the right across the touch panel 7. At this point, the controller 3 generates an operation command that moves the selectable icons 22 right, and the operation command is transmitted from the wireless communication processor 16 to the television 30 (step S20).

If the difference between the current coordinate x and the start coordinate x0 is less than 0, the operation determining unit 11 is able to determine that the finger has moved to the left across the touch panel 7. At this point, the controller 3 generates an operation command that moves the selectable icons 22 left, and the operation command is transmitted from the wireless communication processor 16 to the television 30 (step S21).

After the processing in one of steps S17, S18, S20, and S21, the operation determining unit 11 saves the operation command that was transmitted to the television 30 in the storage 14 (step S22). The operation command is saved in the storage 14 as the last operation command 14e. After that, the operation determining unit 11 updates the start coordinates 14a by overwriting them with the current coordinates 14b (step S23), returns to the processing in step S12, and continues the processing for transmitting operation commands.

Next, an example of converting icon movement when a finger is rapidly flicked into an operation command will be described with reference to FIGS. 21 and 22.

FIG. 21 is an explanatory diagram illustrating an exemplary operation for moving selectable icons 22 by performing a swipe gesture on the touch panel 7. It is configured such that when the user performs a swipe, the television 30 shows the selectable icons 22 (or the selecting cursor 25) displayed on the television 30 continuing to move even after the finger leaves the touch panel 7. For this reason, for a short period of time after a finger leaves the touch panel 7, the mobile client device 10 continues to transmit the same operation command as the last operation command transmitted to the television 30 immediately before the finger disengaged. How long operation commands continue to be transmitted after the finger disengages depends on the translational velocity of the finger immediately before disengaging from the touch panel 7. Meanwhile, it may also be configured such that the selecting cursor 21 moves in response to a swipe.

FIG. 22 is a flowchart illustrating an exemplary process of converting a swipe into an operation command. Once the mobile client device 10 transitions to remote mode, the touch panel 7 scans the panel surface and samples output signals from the touch panel 7 (step S31). During this processing, the translational distance 14c and the last operation command 14e are computed as illustrated in FIG. 21 discussed above, but such processing is not illustrated in FIG. 22.

Next, the input detector 9 determines whether or not a finger has contacted the touch panel 7 (step S32). If the input detector 9 detects that a finger has contacted the touch panel 7, the operation determining unit 11 starts the process for converting a touch operation into an operation command illustrated in FIG. 20 above (step S33). After that, the process returns to step S31 and the sampling of output signals from the touch panel 7 continues.

Herein, the storage 14 is provided with a command output count conversion table 14f, which stores a count of the number of operation commands which have been converted from the translational distance d and output. If the input detector 9 does not detect that a finger has contacted the touch panel 7, the operation determining unit 11 references the translational distance 14c to obtain the last translational distance d, and additionally references the command output count conversion table 14f to obtain the command output count (step S34). Herein, the command output count conversion table 14f converts and stores the translational distance d as a command output count on the basis of processing that adjusts the number of operation commands according to the finger translational magnitude as illustrated in FIG. 19.

After that, the operation determining unit 11 replaces the translational distance d with "0", and updates the translational distance 14c by overwriting it with the replaced translational distance d (step S35). Then, the same operation command as the operation command transmitted immediately before the finger disengaged from the touch panel 7 is continually transmitted for a number of times equal to the output count for the operation command obtained from the command output count conversion table 14f (step S36).

Next, a process for determining the manufacturer of the television 30 controlled by the mobile client device 10 will be described.

First, the following investigation was undertaken by the inventor in order to change an operation command according to the state of the television 30. The television 30 that receives an operation command from the mobile client device 10 does not provide any feedback in response to operations performed by the mobile client device 10. For this reason, the mobile client device 10 cannot ascertain the display state of the television 30 (such as a program display or menu display, for example).

If feedback is not provided in this way, operation commands cannot be changed according to the display state of the television 30, and only one type of operation command can be assigned to one type of operation, for example. For this reason, it was investigated whether or not the mobile client device 10 could ascertain the state of the television 30 by detecting information such as the volume and brightness output by the television 30.

Herein, the mobile client device 10 ascertains the state of the television 30 according to the following method. As discussed above, the television 30 does not report its own state to the mobile client device 10. For this reason, it is necessary for the mobile client device 10 to proactively acquire information from the television 30 in order for the mobile client device 10 to ascertain the state of the television 30.

A method of acquiring information involves the mobile client device 10 using its imaging unit 13 to acquire an image of the display panel 39 of the television 30, and ascertaining the state of the television 30 from the acquired image information. Using this method, the mobile client device 10 realizes a determination on the state of the television 30 largely via the following two steps.

(1) Process for Determining Manufacturer of Television 30

The layout of a screen displayed on the display panel 39 in a state where the television 30 is accepting operation commands differs depending on the manufacturer, such as company A or company B. However, it is presupposed that the layout of icons displayed on the display panel 39 of a television 30 is mostly consistent for each manufacturer and each product brand of the television 30.

Based on this presupposition, it is possible to determine the manufacturer and brand of the television 30 from the icon layout, on the basis of image information acquired by imaging the display panel 39. For this reason, the layout of the screen displayed on the display panel 39 is utilized as supplementary information for determining the state of the television 30. For the determination of the manufacturer, however, an image acquired by the imaging unit 13 may be used to make a determination, or the user may set the manufacturer when launching the application program.

(2) Process for Determining the State of the Television 30 by Image Recognition

The mobile client device 10 acquires of image of the screen on the television 30 with the imaging unit 13. At this point, the imaging unit 13 may be in a state where a through-the-lens image is obtained, without closing the shutter. Then, the state of the television 30 is ascertained by recognizing the acquired image or the through-the-lens image. Note that since the mobile client device 10 is operated while being pointed toward the television 30 in remote mode, it is anticipated that an image capturing the television 30 within the imaging area of the imaging unit 13 can be acquired without any particular conscious effort by the user. A preview by the imaging unit 13 may also be displayed on-screen as necessary.

Specific examples of processes for determining the state of the television 30 will now be described in light of the above investigation.

(1) Manufacturer Determination

Figure 23A:
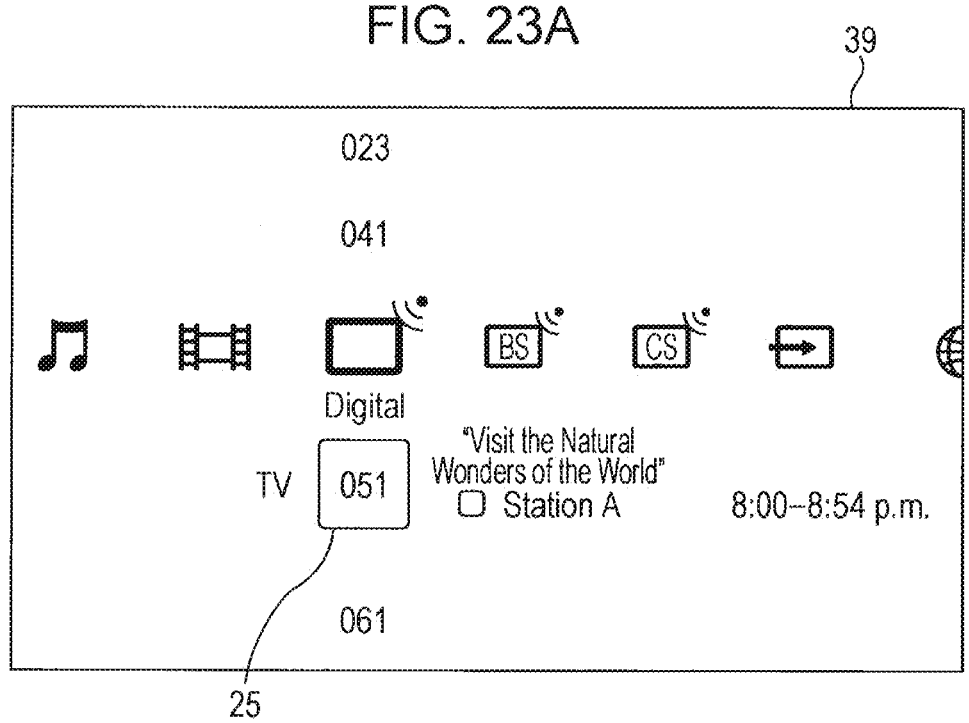
FIGS. 23A and 23B are explanatory diagrams illustrating exemplary menu screen layouts which differ by manufacturer.
Figure 23B:
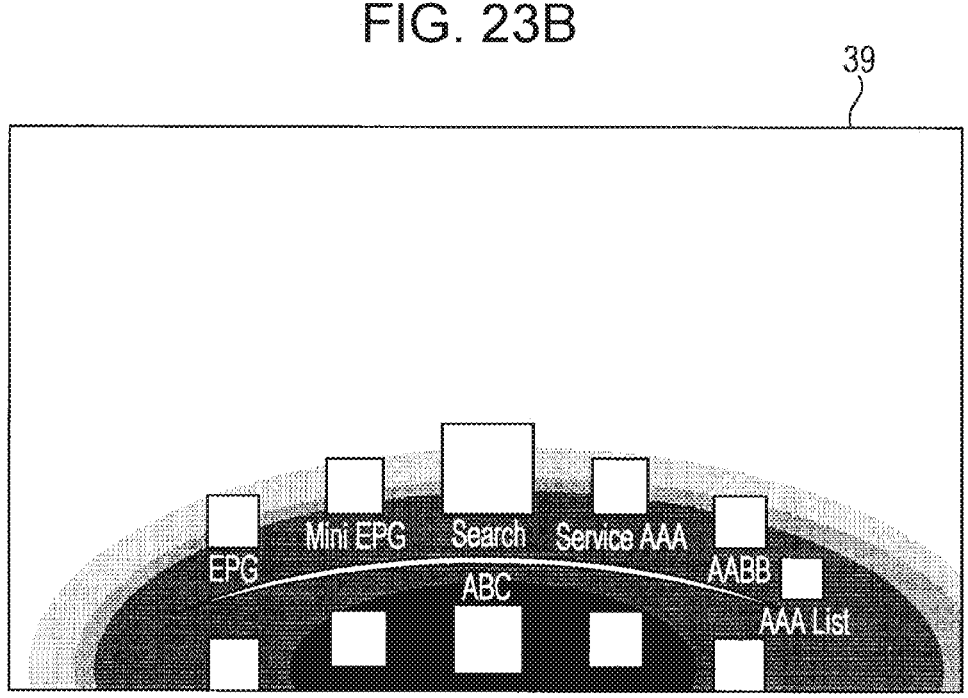

First, exemplary screen layouts of the television 30 will be described. FIGS. 23A and 23B are explanatory diagrams illustrating exemplary menu screen layouts which differ by manufacturer. FIG. 23A illustrates an exemplary menu screen layout for a company A, while FIG. 23B illustrates an exemplary menu screen layout for a company B.

As discussed above, the screen layouts for respective states of the television 30 differ by manufacturer. While the menu screen illustrated in FIG. 23A is similar to the screen layout illustrated in FIG. 6C discussed earlier, the menu screen illustrated in FIG. 23B is laid out such that various app icons are arranged in a semicircle at the bottom of the display panel 39.

The screen layout in which icons, etc. are displayed is nearly the same for individual manufacturers and brands. For this reason, if the mobile client device 10 determines the manufacturer of the television 30 in advance, it is conceivable to narrow the television 30 down to a unique screen layout and be able to transmit operation commands matching that television 30.

Figure 24:
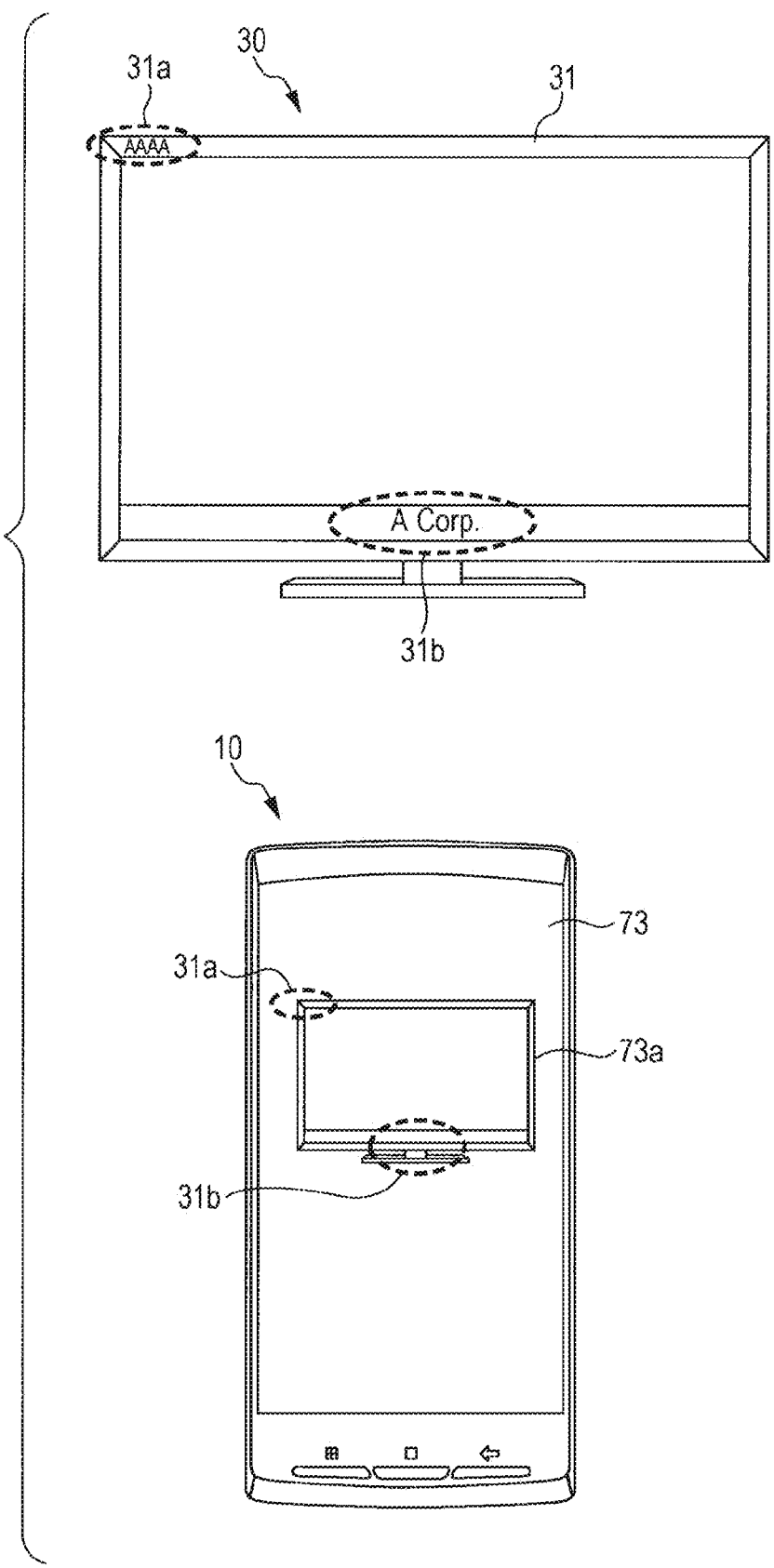
FIG. 24 is an explanatory diagram illustrating exemplary placement positions for logos applied to a television according to an embodiment of the present disclosure.

FIG. 24 is an explanatory diagram illustrating exemplary placement positions for logos applied to the television 30. On the front of the housing 46 of the television 30, a brand logo 31a ("AAAA") is applied in an upper-left position as seen facing the television 30, while a manufacturer logo 31b ("A Corp.") indicating the manufacturer of the television 30 is applied in a bottom-center position. In addition, the mobile client device 10 uses its imaging unit 13 to acquire an image of the television 30, and an image 73a of the captured television 30 is displayed on the display 73.

Herein, the process for determining the manufacturer is realized by applying image recognition to the manufacturer logo 31b captured by the imaging unit 13. At this point, the controller 3 determines the type of television 30 on the basis of the captured image, and generates operation commands matching the type of television 30. If necessary, not only the manufacturer but also the brand of television 30 is determined by additionally applying image recognition to the brand logo 31a captured by the imaging unit 13. Such logos may also be graphical figures or combinations of text and graphical figures, rather than just text.

Figure 25A:
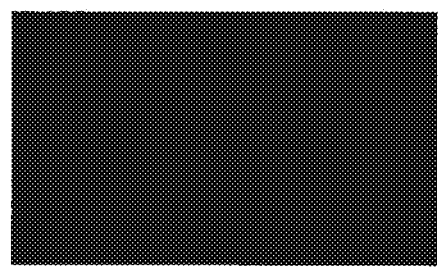
FIGS. 25A-25E are explanatory diagrams illustrating exemplary screens displayed on a display panel depending on the state of a television according to an embodiment of the present disclosure.
Figure 25B:
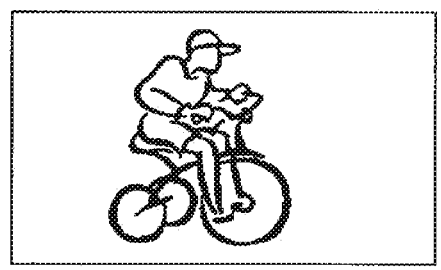
Figure 25C:
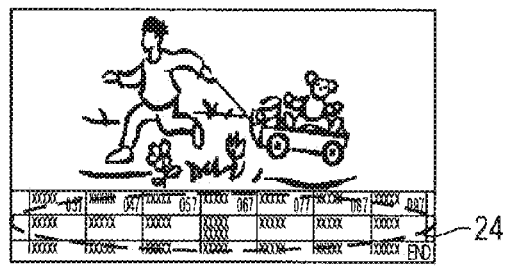
Figure 25D:
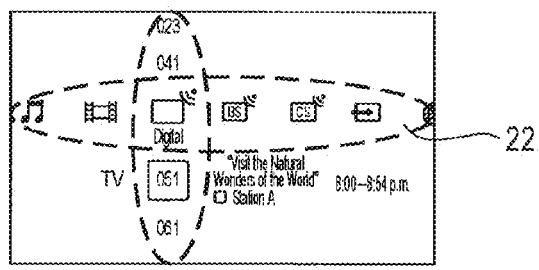
Figure 25E:
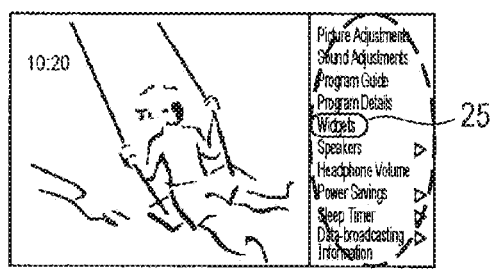

FIGS. 25A-25E are explanatory diagrams illustrating exemplary screens displayed on the display panel 39 depending on the state of the television 30. FIG. 25A illustrates an example of a power off state, while FIG. 25B illustrates an example of a power on state, and FIG. 25C illustrates an example of a state in which the program list 24 is displayed. Also, FIG. 25D illustrates an example of a state in which a menu screen is displayed, while FIG. 25E illustrates an example of a state in which an options screen is displayed.

In the power off state illustrated in FIG. 25A, nothing is displayed on the display panel 39, and the screen is in a black state. In the power on state illustrated in FIG. 25B, the television 30 has entered a state in which a received picture from a station is being presented. In the state displaying the program list 24 illustrated in FIG. 25C, the program list 24 is displayed near the bottom of the display panel 39, overlaying the program being viewed. In the menu screen display state illustrated in FIG. 24D, a plurality of selectable icons 22 are displayed arranged in a cross on top of a specific background color (such as blue, for example). In the options screen display state illustrated in FIG. 24E, the options screens enclosed in broken lines is displayed on the right side of the screen upon which the current broadcast program is displayed.

As illustrated in FIGS. 25A to 25E, the screen layout differs greatly depending on the state of the television 30. For this reason, the controller 3 applies image recognition that accounts for the characteristics of the picture displayed on the display panel 39 according to each state. The state of the television 30 is determined from an image thus recognized, and the associative relationship is changed for operation commands transmitted to the television 30 when the mobile client device 10 is operated.

FIG. 26 is a sequence diagram illustrating an exemplary process in which the mobile client device 10 determines the state of the television 30. In this process, the controller 3 provided in the mobile client device 10 is configured to determined the state of the television 30 by issuing a query via a network to a state determination database 60 which stores various states of the television 30.

First, the mobile client device 10 launches a remote app upon starting the process for determining the state of the television 30 (step S41). Next, the mobile client device 10 uses its imaging unit 13 to take a picture of the screen displayed on the display panel 39 of the television 30 (step S42), and acquires information on the screen displayed on the display panel 39 of the television 30 (step S43).

At this point, the mobile client device 10 ascertains information on the manufacturer of the television 30 from a manufacturer logo extracted from the acquired screen information. If such manufacturer information is already saved in the storage 14, manufacturer logo comparison can be conducted rapidly.

Next, the mobile client device 10 accesses the state determination database 60 via a network to which the mobile client device 10 is connected by means of the wireless communication processor 16 and the antenna 15. The acquired screen information and manufacturer information is then sent to the state determination database 60, and a determination of the state of the television 30 is requested (step S44).

The state determination database 60 transmits the state of the television 30 as determined on the basis of the received screen information and manufacturer information to the mobile client device 10 (step S45), and the mobile client device 10 determines the state of the television 30.

Although the state determination database 60 is described as being accessed via a network, it may also be configured such that the state determination database 60 is saved in the storage 14 of the mobile client device 10, with the controller 3 determining the state of the television 30.

FIG. 27 is a table illustrating associations between the operation locations and operation types for a power off state, power on state, menu screen display state, and options screen display state of the television 30.

An operation location on the touch panel 7 is listed as "arbitrary" for the operation type that launches the remote control application program. This is because any position on the touch panel 7 may be used when launching the remote control application program. For this reason, the icon used to launch the application program may be possibly displayed at an arbitrary position on the display 73 of the mobile client device 10. Herein, if the application program is launched while the television 30 is in the power off state, a power on operation command is transmitted to the television 30 as the application program is launched. The television 30 thus powers on and transitions to the power on state.

An operation location is placed near the center (center area 7C) of the touch panel 7 because it is associated with five operation types. Note that in the drawing, the touch panel 7 is abbreviated to "panel". When the operation type is "tap operation", a selectable icon 22 that has been selected is confirmed while in the menu screen display state or the options screen display state. When the operation type is "double tap", the menu screen is turned on and the screen is transitioned to the menu screen display state if in the power on state, whereas the menu screen is turned off and the screen is transitioned to the power on state if in the menu screen display state.

When the operation type is "long press", an operation command for powering on the television 30 is transmitted if in the power off state. In contrast, an operation command for powering off the television 30 is transmitted if in the power on state, the menu screen display state, or the options screen display state. When the operation type is "finger movement", selectable icons 22 are moved so as to follow the movement of a finger moved up, down, left, or right if in the menu screen display state. Meanwhile, finger movement up or down is treated as movement of the selectable icons 22 if in the options screen display state. When the operation type is "swipe", finger movement to the right is treated as changing the channel up, while finger movement to the left is treated as changing the channel down if in the power on state. Additionally, selectable icons 22 are moved up, down, left, or right with added inertia if in the menu screen display state. Meanwhile, if in the options screen display state, finger movement to the right is treated as changing the channel up, finger movement to the left is treated as changing the channel down, and finger movement up or down is treated as movement of the selecting cursor 25 with added inertia.

An operation location is placed at the right edge (right area 7R) of the touch panel 7 because it is associated with the position of the options screen. When the operation type is "tap operation", an options screen is made to appear from the right edge of the screen on the display panel 39 and the screen transitions to the options screen display state if in the power on state. Also, the screen returns to the power on state if in the options screen display state.

Figure 28:
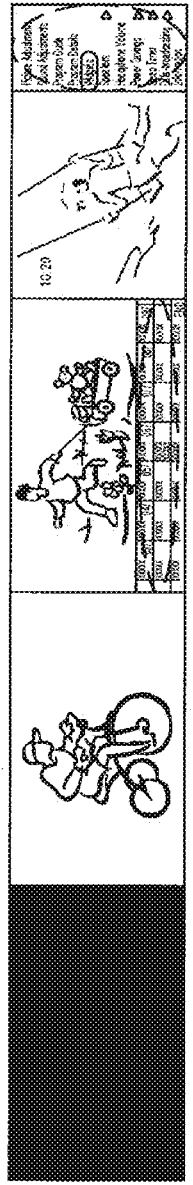
FIG. 28 is a table illustrating associations between the operation locations and operation types for a power-off state, power-on state, program list display state, and options screen display state of a television according to an embodiment of the present disclosure.

FIG. 28 is a table illustrating associations between the operation locations and operation types for a power off state, power on state, program list display state, and options screen display state of the television 30.

An operation location is placed at the left edge (left area 7L) of the touch panel 7 in order to distinguish the launching of widgets from other operations. Widgets are services that deliver user-desired information besides TV broadcasts and split into various categories. Information provided by widgets may include cooking recipes and weather forecasts, for example. When the operation type is "tap operation", widgets are launched if in the power on state.

When the operation location is the "top edge (top area 7T) of the touch panel 7" and the operation type is "tap operation", input into the television 30 is switched if in the power on state. This input switching may switch among a DVD recorder, VCR, and an HDD recorder, for example.

When the operation location is the "bottom edge (bottom area 7B) of the touch panel 7" and the operation type is "tap operation", the screen is switched to a program list display state if in the power on state. Herein, the program list display state refers to a state in which the program list 24 is displayed overlaying the broadcast program being displayed fullscreen on the display panel 39. Meanwhile, if in the program list display state, the program list display state is ended and the screen returns to the power on state.

According to a mobile client device 10 in accordance with the embodiment described above, tap operations and swipes performed on a touch panel 7 are converted into operation commands for a television 30 by which the television 30 can be operated. The user is able to perform operations while looking at selection icons and a selecting cursor, etc. displayed on the television 30, without checking the touch panel 7 being operated in his or her hands. Additionally, operations on the touch panel 7 can be performed with one finger using tap operations and swipes, etc., thus making one-handed operation possible for the user.

Also, a plurality of detection areas for detecting when a finger operation is performed (such as the top area 7T and the bottom area 7B in the present embodiment) are set on the touch panel 7. For this reason, it is possible to assign different types of operation commands to an operation performed in respective detection areas. For example, in the case where a finger is moved left, right, up, or down from the center of the touch panel 7, an operation can be performed which moves selectable icons displayed on the display panel 39 left or right, or which confirms a specific program.

Also, when a finger is moved in a given direction from an origin, with the origin being taken to be the position on the touch panel 7 first contacted by the finger, the direction in which the finger moved is roughly computed if the finger is within a specific area centered about the origin. For this reason, it becomes easier for the user to move selectable icons, etc. in an intended direction without looking at the touch panel 7.

Additionally, a plurality of circles centered about the origin on the touch panel 7 are set at equal intervals, and it is configured such that an operation command is transmitted to the television 30 when a finger crosses a circle. For this reason, an operation command is transmitted multiple times according to the translational distance moved by the finger while contacting the touch panel 7, and thus operation commands can be reliably transmitted to the television 30.

Also, the operation determining unit 11 sets a dead zone 52 within a given range from the center of the touch panel 7 or a finger tap position on the touch panel 7. Inside the dead zone 52, operation commands are not transmitted to the television 30. For this reason, unintended operation commands are transmitted due to slight movements of a finger contacting the touch panel 7.

Furthermore, operations like the following illustrated in FIG. 29 may be assigned as remote control operations for a mobile client device 10 in accordance with a modification of an embodiment of the present disclosure.

FIG. 29 is a table illustrating associations between the operation types and operation commands of operations performed using an acceleration sensor and volume buttons used by the mobile client device 10. In the case of using an acceleration sensor included among the sensors 17 for operations, the operation determining unit 11 determines the operation type on the basis of sensor output received from the sensors 17, and the controller 3 applies control to generate and transmit an operation command on the basis of the determined operation type.

For example, if an operation is performed in which the user waves the mobile client device 10 to the right, the mobile client device 10 transmits an operation command for changing the channel up to the television 30. Conversely, if an operation is performed in which the user waves the mobile client device 10 to the left, the mobile client device 10 transmits an operation command for changing the channel down to the television 30. The correspondence between these operations and the channels may also be reversed, and the changing of the channel up and down may also be respectively assigned to when the mobile client device 10 is waved up and down.

Also, in the case of using volume buttons included among the operable keys 8, the operation determining unit 11 outputs an operation command on the basis of an output value received from the operable keys 8. For example, if the user presses the plus volume button, the mobile client device 10 transmits an operation command for raising the volume of the television 30. Conversely, if the user presses the minus volume button, the mobile client device 10 transmits an operation command for lowering the volume of the television 30. However, the volume of the television 30 may also be varied using other keys or buttons instead of volume buttons, while the volume buttons may also be used to vary the state of the television 30 in ways other than volume. Additionally, a volume button may be displayed as an icon on the display 73, and operations performed on the icon may be assigned to the operation types and operation commands illustrated in FIG. 29.

Also, although the shape of the touch panel 7 is taken to be rectangular, it may also be an arbitrary shape such as polygonal or round. In addition, although it is configured such that the selecting cursor 21 displayed on the display panel 39 is kept stationary while operations are performed to move the selectable icons 22, it may also be configured such that the selectable icons 22 are kept stationary and operations can be conducted to move the selecting cursor 21.

Also, in the foregoing embodiment, it is configured such that the television 30 is operated by transmitting operation commands thereto. However, it may also be configured such that operation commands are transmitted to an external device connected to the television 30 (such as an HDD recorder or set-top box, for example), and the television 30 is operated via control by the external device.

Also, although the foregoing embodiment describes an example applied to a television 30 that uses an LCD panel as its display panel 39, the configuration may also be such that another display device such as a projector is remotely controlled.

Furthermore, although the same screen as the menu screen displayed on the display panel 39 is not displayed on the touch panel 7, icons may also be displayed as thumbnails on the display 73, with menu choices being confirmed by moving the icons with a finger.

Additionally, a series of processes according to the foregoing embodiment may also be executed in software in some cases. In such cases, a program constituting such software may be executed by a computer built into special-purpose hardware, or alternatively, by a computer onto which programs for executing various functions are installed. For example, a program constituting the desired software may be installed and executed on a general-purpose personal computer.

Also, a recording medium storing program code of software that realizes the functions of the foregoing embodiment may also be supplied to a system or apparatus. It is furthermore obvious that the functions are realized by a computer (or CPU or other control apparatus) in such a system or apparatus reading out and executing the program code stored in the recording medium.

The recording medium used to supply program code in this case may be a flexible disk, hard disk, optical disc, magneto-optical disc, CD-ROM, CD-R, magnetic tape, non-volatile memory card, or ROM, for example.

Also, the functions of the foregoing embodiment are realized by a computer executing read-out program code. In addition, some or all of the actual operations are conducted on the basis of instructions from such program code by an OS, etc. running on the computer. This also includes cases where the functions of the foregoing embodiment are realized by such operations. Moreover, processes according to an embodiment as described above may also be realized in hardware rather than being executed in software.

Furthermore, the present disclosure is not limited to the foregoing embodiment, and obviously various other applications and modifications may be obtained insofar as they do not depart from the principal matter of the present disclosure stated in the claims. For this reason, it is to be understood as obvious by persons skilled in the art that various modifications, combinations, and other embodiments may occur depending on design or other factors insofar as they are within the scope of the claims or their equivalents.

Additionally, the present disclosure may also take configurations like the following.

(1) An information processing apparatus comprising: a touch panel; and circuitry configured to detect an input operation to the touch panel based on an output of the touch panel; create an operation command to change content displayed on a display apparatus based on a detected input operation to the touch panel; and control a wireless interface to transmit the operation command to the display apparatus controlling the display apparatus to change the content displayed on the display apparatus.

(2) The information processing apparatus of (1), wherein a plurality of detection areas for detecting an input operation are set in relation to the touch panel.

(3) The information processing apparatus of any of (1) to (2), wherein the circuitry is configured to create different operation commands based on which of the plurality of detection areas an input operation is detected.

(4) The information processing apparatus of any of (2) to (3), wherein the plurality of detection areas include a top area, a bottom area, a left area, a right area, and a center area.

(5) The information processing apparatus of any of (1) to (5), wherein the circuitry is further configured to: detect a drag input operation as the input operation to the touch panel and a direction corresponding to the drag input operation; create, as the operation command, a command commanding the display apparatus to scroll the content displayed on the display apparatus in a direction corresponding to the detected direction corresponding to the drag input operation; and control the wireless interface to transmit the operation command to the display apparatus.

(6) The information processing apparatus of any of (1) to (5), further comprising: a display, wherein the touch panel is formed on or integrally with the display, wherein the circuitry is further configured to control the display to display an icon corresponding to a remote control program executed by the circuitry; create an activation command to activate the display apparatus when an input operation is detected on the touch panel in a position corresponding to the displayed icon; and control the wireless interface to transmit the activation command to the display apparatus.

(7) The information processing apparatus of any of (1) to (6), wherein the circuitry is further configured to: detect a swipe input operation as the input operation to the touch panel and a direction corresponding to the swipe input operation; create, as the operation command, a command commanding the display apparatus to sequentially change a channel of programming displayed by the display apparatus based the direction corresponding to the swipe input operation; and control the wireless interface to transmit the operation command to the display apparatus.

(8) The information processing apparatus of any of (1) to (7), wherein the circuitry is further configured to: detect an upward swipe input operation as the input operation to the touch panel; create, as the operation command, a command commanding the display apparatus to reduce a size of content being reproduced by the display apparatus and display a menu simultaneously with the reduced size content; and control the wireless interface to transmit the operation command to the display apparatus.

(9) The information processing apparatus of (8), wherein the circuitry is further configured to: detect a horizontal swipe input operation as the input operation to the touch panel when the reduced size content and the menu are simultaneously displayed by the display apparatus; create, as the operation command, a command commanding the display apparatus to scroll the menu in a direction corresponding to the direction of the horizontal swipe input operation; and control the wireless interface to transmit the operation command to the display apparatus.

(10) The information processing apparatus of any of (1) to (9), wherein the circuitry is further configured to: detect a tap input operation as the input operation to the touch panel; create, as the operation command, a command commanding the display apparatus to display a menu for switching between content displayed by the display apparatus; and control the wireless interface to transmit the operation command to the display apparatus.

(11) The information processing apparatus of (10), wherein the circuitry is further configured to: detect a swipe input operation as the input operation to the touch panel; create, as the operation command, a command commanding the display apparatus to scroll the menu in a direction corresponding to the swipe input operation; and control the wireless interface to transmit the operation command to the display apparatus.

(12) The information processing apparatus of any of (2) to (11), wherein the plurality of detection areas includes at least a first detection area and a second detection area, and the circuitry is further configured to: detect a tap input operation as the input operation to the touch panel; create, as the operation command, a first command commanding the display apparatus to display a first menu when the tap input operation is detected in the first detection area, and a second command commanding the display to display a second menu when the tap input operation is detected in the second detection area; and control the wireless interface to transmit the operation command to the display apparatus.

(13) The information processing apparatus of any of (1) to (12), further comprising: an image capturing unit configured to capture an image of the display apparatus.

(14) The information processing apparatus of (13), wherein the circuitry is further configured to perform image recognition on the image of the display apparatus to determine a manufacturer of the display apparatus.

(15) The information processing apparatus of (14), wherein the circuitry is configured to control the wireless interface to transmit the operation command to the display apparatus based on the determined manufacturer of the display apparatus.

(16) The information processing apparatus of any of (1) to (15), wherein the circuitry is further configured to determine a state of the display apparatus.

(17) The information processing apparatus of (14), wherein the circuitry is configured to determine a state of the display apparatus by controlling the wireless interface to transmit the captured image of the display apparatus and information corresponding to the manufacturer of the display apparatus to a database, and receiving, from the database via the wireless interface, a state of the display apparatus.

(18) A method performed by an information processing apparatus, the method comprising: detecting an input operation to a touch panel based on an output of the touch panel; creating an operation command to change content displayed on a display apparatus based on a detected input operation to the touch panel; and control a wireless interface to transmit the operation command to the display apparatus controlling the display apparatus to change the content displayed on the display apparatus.

(19) A non-transitory computer-readable medium including computer program instructions, which when executed by an information processing apparatus, cause the information processing apparatus to: detect an input operation to a touch panel based on an output of the touch panel; create an operation command to change content displayed on a display apparatus based on a detected input operation to the touch panel; and control a wireless interface to transmit the operation command to the display apparatus controlling the display apparatus to change the content displayed on the display apparatus.

The invention claimed is:

1. An information processing apparatus comprising:
a touch panel; and
circuitry configured to
   detect a swipe input operation to the touch panel;
   create operation information to cause a display apparatus to change content displayed on the display apparatus based on the detected swipe input operation to the touch panel, the content including a two-dimensional array of graphical representations, the operation information including information to cause the display apparatus to scroll at least some of the content in a direction corresponding to a swipe input direction such that said at least some of the content continues to move after an end of the swipe input operation for a time determined by a speed of the swipe input operation; and
   control a wireless interface to transmit the operation information to the display apparatus to cause the display apparatus to change the content displayed on the display apparatus by scrolling said at least some of the content in the direction corresponding to the swipe input direction.

2. The information processing apparatus of claim 1, wherein
   the circuitry is configured to divide the touch panel into a plurality of detection areas for detecting the swipe input operation.

3. The information processing apparatus of claim 2, wherein
   the circuitry is configured to create different operation information based on at least one of the plurality of detection areas in which the swipe input operation is detected.

4. The information processing apparatus of claim 3, wherein
   the plurality of detection areas include a top area, a bottom area, a left area, a right area, and a center area.

5. The information processing apparatus of claim 2, wherein
   the plurality of detection areas includes at least a first detection area and a second detection area, and
   the circuitry is further configured to:
      detect a tap input operation as an additional input operation to the touch panel;
      create, as additional operation information, first information to cause the display apparatus to display a first menu when the tap input operation is detected in the first detection area, and second information to cause the display to display a second menu when the tap input operation is detected in the second detection area; and
      control the wireless interface to transmit the additional operation information to the display apparatus.

6. The information processing apparatus of claim 1, wherein the scrolling is a scrolling of only a part of the content.

7. The information processing apparatus of claim 1, further comprising:
   a display, wherein the touch panel is formed on or integrally with the display, wherein the circuitry is further configured to
      control the display to display a graphical representation corresponding to a remote control program executed by the circuitry;
      create activation information to cause the display apparatus to activate when an input operation is detected on the touch panel in a position corresponding to the displayed graphical representation; and
      control the wireless interface to transmit the activation information to the display apparatus.

8. The information processing apparatus of claim 1, wherein the circuitry is further configured to:
   detect an additional swipe input operation as an additional input operation to the touch panel and a direction corresponding to the additional swipe input operation;
   create, as additional operation information, information to cause the display apparatus to sequentially change a channel of programming displayed by the display apparatus based on the direction corresponding to the additional swipe input operation; and
   control the wireless interface to transmit the additional operation information to the display apparatus.

9. The information processing apparatus of claim 1, wherein the circuitry is further configured to:
   detect an upward swipe input operation as an additional input operation to the touch panel;
   create, as additional operation information, information to cause the display apparatus to reduce a size of content being reproduced by the display apparatus and display a menu simultaneously with the reduced size content; and
   control the wireless interface to transmit the additional operation information to the display apparatus.

10. The information processing apparatus of claim 9, wherein the circuitry is further configured to:
    detect a horizontal swipe input operation as another additional input operation to the touch panel when the reduced size content and the menu are simultaneously displayed by the display apparatus;
    create, as other additional operation information, information to cause the display apparatus to scroll the menu in a direction corresponding to the direction of the horizontal swipe input operation; and
    control the wireless interface to transmit the other additional operation information to the display apparatus.

11. The information processing apparatus of claim 1, wherein the circuitry is further configured to:
    detect a tap input operation as an additional input operation to the touch panel;
    create, as additional operation information, information to cause the display apparatus to display a menu for switching between content displayed by the display apparatus; and
    control the wireless interface to transmit the additional operation information to the display apparatus.

12. The information processing apparatus of claim 11, wherein the circuitry is further configured to:
    detect an additional swipe input operation as another additional input operation to the touch panel;
    create, as other additional operation information, information to cause the display apparatus to scroll the menu in a direction corresponding to the additional swipe input operation; and
    control the wireless interface to transmit the other additional operation information to the display apparatus.

13. The information processing apparatus of claim 1, further comprising:

an image capturing unit configured to capture an image of the display apparatus.

14. The information processing apparatus of claim 13, wherein the circuitry is further configured to perform image recognition on the image of the display apparatus to determine a manufacturer of the display apparatus.

15. The information processing apparatus of claim 14, wherein the circuitry is configured to control the wireless interface to transmit the operation information to the display apparatus based on the determined manufacturer of the display apparatus.

16. The information processing apparatus of claim 1, wherein the circuitry is further configured to determine a state of the display apparatus.

17. The information processing apparatus of claim 14, wherein the circuitry is configured to determine a state of the display apparatus by controlling the wireless interface to transmit the captured image of the display apparatus and information corresponding to the manufacturer of the display apparatus to a database, and receiving, from the database via the wireless interface, the state of the display apparatus.

18. A method performed by an information processing apparatus, the method comprising:
  detecting a swipe input operation to a touch panel;
  creating operation information to cause a display apparatus to change content displayed on the display apparatus based on the detected swipe input operation to the touch panel, the content including a two-dimensional array of graphical representations, the operation information including information to cause the display apparatus to scroll at least some of the content in a direction corresponding to a swipe input direction such that said at least some of the content continues to move after an end of the swipe input operation for a time determined by a speed of the swipe input operation; and
  controlling a wireless interface to transmit the operation information to the display apparatus to cause the display apparatus to change the content displayed on the display apparatus.

19. A non-transitory computer-readable medium including computer program instructions, which when executed by an information processing apparatus, cause the information processing apparatus to:
  detect a swipe input operation to a touch panel;
  create operation information to cause a display apparatus to change content displayed on the display apparatus based on the detected swipe input operation to the touch panel, the content including a two-dimensional array of graphical representations, the operation information including information to cause the display apparatus to scroll at least some of the content in a direction corresponding to a swipe input direction such that said at least some of the content continues to move after an end of the swipe input operation for a time determined by a speed of the swipe input operation; and
  control a wireless interface to transmit the operation information to the display apparatus to cause the display apparatus to change the content displayed on the display apparatus by scrolling said at least some of the content in the direction corresponding to the swipe input direction.

* * * * *